(12) United States Patent
Yamazaki et al.

(10) Patent No.: US 10,432,251 B2
(45) Date of Patent: Oct. 1, 2019

(54) RECEIVER, TRANSMITTER, RADIO COMMUNICATION SYSTEM, AND RADIO COMMUNICATION METHOD

(71) Applicant: Mitsubishi Electric Corporation, Chiyoda-ku (JP)

(72) Inventors: Makoto Yamazaki, Chiyoda-ku (JP); Tomohiro Ogino, Chiyoda-ku (JP); Akinori Fujimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/082,461

(22) PCT Filed: Mar. 23, 2017

(86) PCT No.: PCT/JP2017/011788
§ 371 (c)(1),
(2) Date: Sep. 5, 2018

(87) PCT Pub. No.: WO2017/170147
PCT Pub. Date: Oct. 5, 2017

(65) Prior Publication Data
US 2019/0089404 A1    Mar. 21, 2019

(30) Foreign Application Priority Data

Mar. 28, 2016  (JP) ................................ 2016-064487

(51) Int. Cl.
*H04B 1/707*  (2011.01)
*H04B 1/7075*  (2011.01)
(Continued)

(52) U.S. Cl.
CPC ......... *H04B 1/7075* (2013.01); *H04B 1/7073* (2013.01); *H04B 1/7077* (2013.01);
(Continued)

(58) Field of Classification Search
CPC .. H04B 1/707; H04B 7/18505; H04B 1/7143; H04B 1/7087; H04B 1/715; H04L 1/0003; H04L 1/0009; H04L 9/0631
See application file for complete search history.

(56) References Cited

U.S. PATENT DOCUMENTS 6,822,999 B1 * 11/2004 Lee ...................... H04B 1/7075
375/141
7,609,751 B1 * 10/2009 Giallorenzi .......... H04B 1/7087
375/140
(Continued)

FOREIGN PATENT DOCUMENTS

JP  7-95130 A  4/1995
JP  11-122141 A  4/1999
(Continued)

OTHER PUBLICATIONS

International Search Report dated Jun. 13, 2017 in PCT/JP2017/011788 filed Mar. 23, 2017.
(Continued)

*Primary Examiner* — Dac V Ha
(74) *Attorney, Agent, or Firm* — Oblon, McClelland, Maier & Neustadt, L.L.P.

(57) ABSTRACT

A receiver includes a reception antenna, a reception unit, and a demodulation unit. The reception unit sequentially receives modulated signals resulting from spread spectrum via the reception antenna. The demodulation unit demodulate a first signal received by the reception unit by performing despreading using a short-period spreading code, the first signal including information for identifying a long-period spreading code. The demodulation unit identifies the long-period spreading code on the basis of the information obtained from the first signal. The demodulation unit then demodulates a second signal received by the reception unit
(Continued)

after the first signal by performing despreading using the long-period spreading code.

12 Claims, 19 Drawing Sheets

(51) Int. Cl.
  *H04B 1/7073* (2011.01)
  *H04B 1/7143* (2011.01)
  *H04J 13/16* (2011.01)
  *H04B 1/7087* (2011.01)
  *H04B 1/715* (2011.01)
  *H04B 7/185* (2006.01)
  *H04L 1/00* (2006.01)
  *H04L 9/06* (2006.01)
  *H04B 1/7077* (2011.01)

(52) U.S. Cl.
  CPC ........... *H04B 1/7087* (2013.01); *H04B 1/715* (2013.01); *H04B 1/7143* (2013.01); *H04B 7/18508* (2013.01); *H04J 13/16* (2013.01); *H04L 1/0003* (2013.01); *H04L 1/0009* (2013.01); *H04L 9/0631* (2013.01)

(56) References Cited

U.S. PATENT DOCUMENTS

| | | | |
|---|---|---|---|
| 2003/0199279 A1* | 10/2003 | Roberts | H04L 1/0003 455/452.2 |
| 2010/0158256 A1* | 6/2010 | Sawahashi | H04J 13/16 380/287 |
| 2017/0272117 A1 | 9/2017 | Fujimura | |

FOREIGN PATENT DOCUMENTS

| | | |
|---|---|---|
| JP | 11-355178 A | 12/1999 |
| JP | 2006-50032 A | 2/2006 |
| WO | WO 2015/173928 A1 | 11/2015 |

OTHER PUBLICATIONS

L. Simone, et al., "On-Board TTC Transponder for Secure Communications," The 2011 Military Communications Conference, Track 5, Nov. 2011, pp. 1754-1759.

* cited by examiner

RECEIVER, TRANSMITTER, RADIO COMMUNICATION SYSTEM, AND RADIO COMMUNICATION METHOD

TECHNICAL FIELD

The present invention relates to a receiver, a transmitter, a radio communication system, and a radio communication method.

BACKGROUND ART

On-board telemetry, tracking and command (TTC) transponders are used for communication for monitoring the condition of a satellite, communication of orbit parameters, and communication for operation control of a satellite, where achievement of communication quality, confidentiality resistance to jamming, and resistance to interference is a key issue.

In recent years, for suppressing jamming and interference to uplink signals for sending control commands from a ground station to a satellite station, the direct sequence spread spectrum method using a long-period spreading code according to the advanced encryption standard (AES) technique is becoming mainstream as described in Non Patent Literature 1. The code period of the long-period spreading code is about 40 years.

In a case where a short-period spreading code is used, the short-period spreading code, which has a short code pattern, may be identified by a third party. If the spreading code is identified, there may be jamming caused by a third party on the ground transmitting a pseudo command signal using the same code pattern as the identified spreading code toward a satellite station, which may cause loss of synchronization of a demodulator in the satellite station or erroneous lock despite a low transmission power density. Alternatively, a command signal using the same spreading code pattern from another satellite communication system may be received as an interference wave, which may cause similar effects.

In contrast, when a long-period spreading code is used, there is no risk that the code pattern of the long-period spreading code is identified by a third party, and such jamming as above will not be received. In addition, since the code pattern is different from those of existing short-period spreading codes, there will be no influence of interference from another satellite communication system.

When the long-period spreading code is used, however, since the spreading code does not have periodicity within time on the order of several milliseconds to several seconds, to which the synchronization techniques for short-period spreading code cannot be applied, establishment of a technique for synchronization of the spreading code at the satellite station will be a problem.

To address the problem, in a method described in Non Patent Literature 1, a ground station spread spectrum modem (GS-SSM) of a ground station demodulates frame synchronization data (FSD) that are periodically transmitted from a satellite station, thereafter adjusts the transmission timing taking a propagation delay between the satellite station and the ground station into account, and adjusts a phase difference between a pseudorandom noise (PN) code phase of the received uplink signal and a PN code generated by the satellite station to be within a delay of approximately 1000 chips, to establish synchronization of the long-period spreading code. In addition, for correct acquisition of codes by an on-board spread spectrum transponder (SST), the reception period of the FSD needs to be longer than the code acquisition time of the SST. The aforementioned technique allows the SST of the satellite station to achieve synchronization independent of the PN code length of an uplink signal like the PN code acquisition with a short-period spreading code.

CITATION LIST

Patent Literature

Patent Literature 1: WO 2015/173928 A

Non Patent Literature

Non Patent Literature 1: L. Simone, D. Gelfusa, S. Ciarcia, G. Fittipaldi, "On-Board TTC Transponder for Secure Communications", pp 1754-1759, The 2011 Military Communications Conference Track 5, November 2011

SUMMARY OF INVENTION

Technical Problem

As described above, since the system of the related art is a system in which the ground station synchronizes with the transmission timing of FSD transmitted by the satellite station, there is a problem that it takes several seconds to switch to a long-period spreading code and establish synchronization. In addition, since the periodic transmission timings of FSD are detected by a third party on the ground, the third party may abuse the timing using the FSD to make pulse jamming or the like against an uplink command signal, which poses a problem that a synchronization process with a long-period spreading code can be disturbed. Furthermore, with the method described in Non Patent Literature 1, even when a signal is subjected to jamming or interference using a short-period spreading code, there is no means for identifying the short-period spreading code, which poses a problem that detailed analysis of a jamming wave or an interference wave cannot be provided.

An object of the present invention is to accelerate switching from a short-period spreading code to a long-period spreading code.

Solution to Problem

A receiver according to one aspect of the present invention includes:

a reception unit to sequentially receive modulated signals resulting from spread spectrum from a transmitter; and a demodulation unit to demodulate a first signal received by the reception unit by performing despreading using a first spreading code, the first signal including information for identifying a second spreading code with a longer code period than the first spreading code, identify the second spreading code on a basis of information obtained from the first signal, and demodulate a second signal received after the first signal by the reception unit by performing despreading using the second spreading code.

Advantageous Effects of Invention

According to the present invention, switching from a short-period spreading code to a long-period spreading code is accelerated.

DESCRIPTION OF EMBODIMENTS

Figure 1:
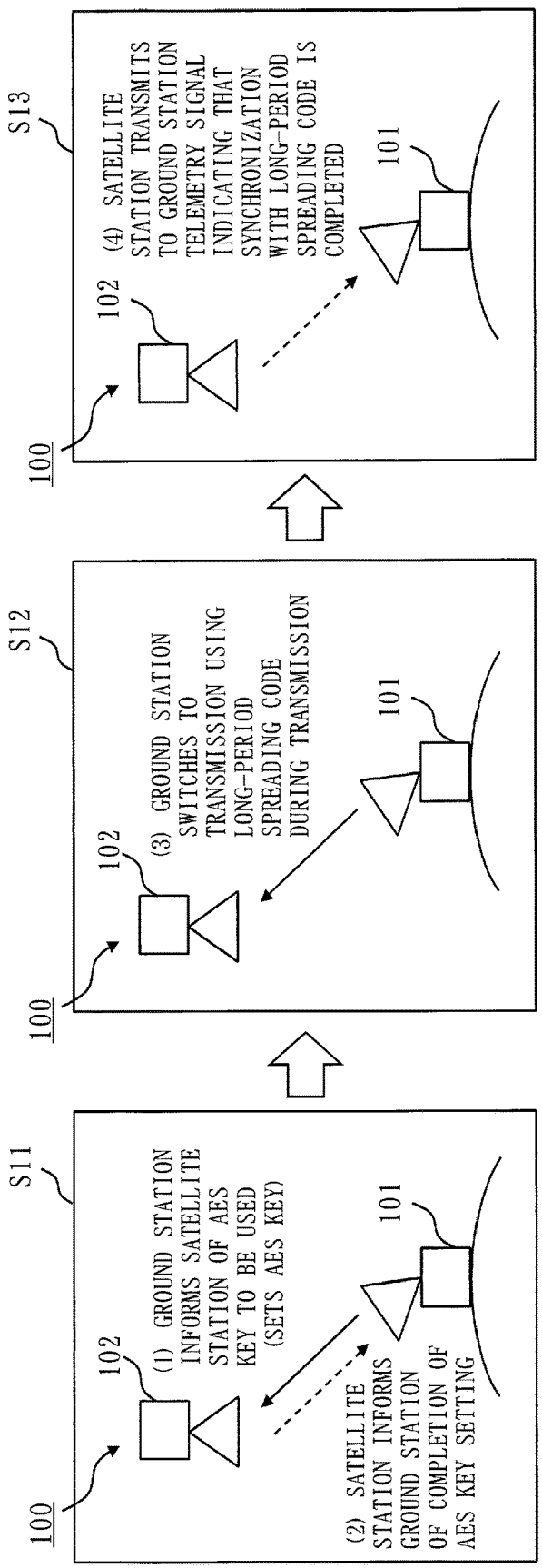
FIG. 1 is a diagram illustrating a long-period spreading code synchronization flow of a radio communication system according to a first embodiment.

Embodiments of the present invention will now be described with reference to the drawings. Note that, in the drawings, the same or corresponding parts or components are represented by the same reference numerals. In the description of the embodiments, description of the same or corresponding parts or components will not be repeated or will be provided in a simplified manner as appropriate.

First Embodiment

\*\*\*Description of Configuration\*\*\*

A configuration of a radio communication system 100 according to the present embodiment will be described with reference to FIGS. 1 to 3.

As illustrated in FIG. 1, the radio communication system 100 includes a ground station 101 and a satellite station 102. The ground station 101 has a transmitter 200 illustrated in FIG. 2. The satellite station 102 has a receiver 300 illustrated in FIG. 3.

Figure 2:
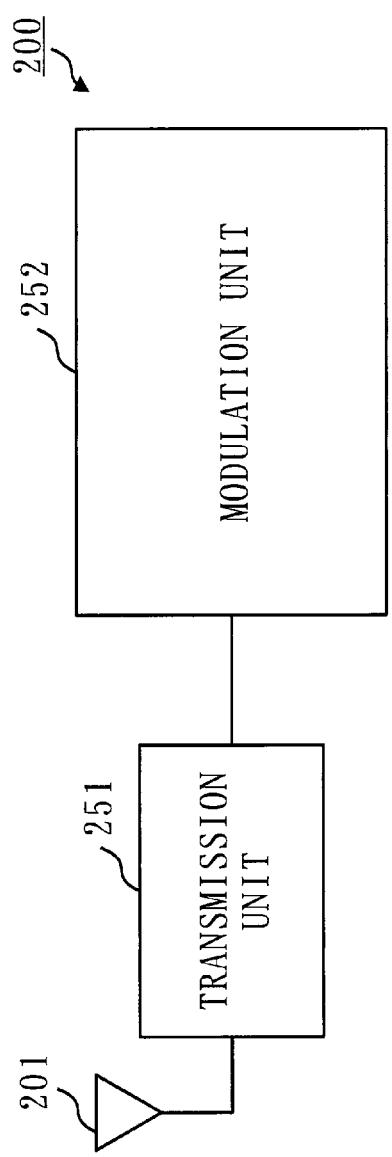
FIG. 2 is a block diagram illustrating a configuration of a transmitter of the radio communication system according to the first embodiment.

As illustrated in FIG. 2, the transmitter 200 includes a transmission antenna 201, a transmission unit 251, and a modulation unit 252.

Figure 3:
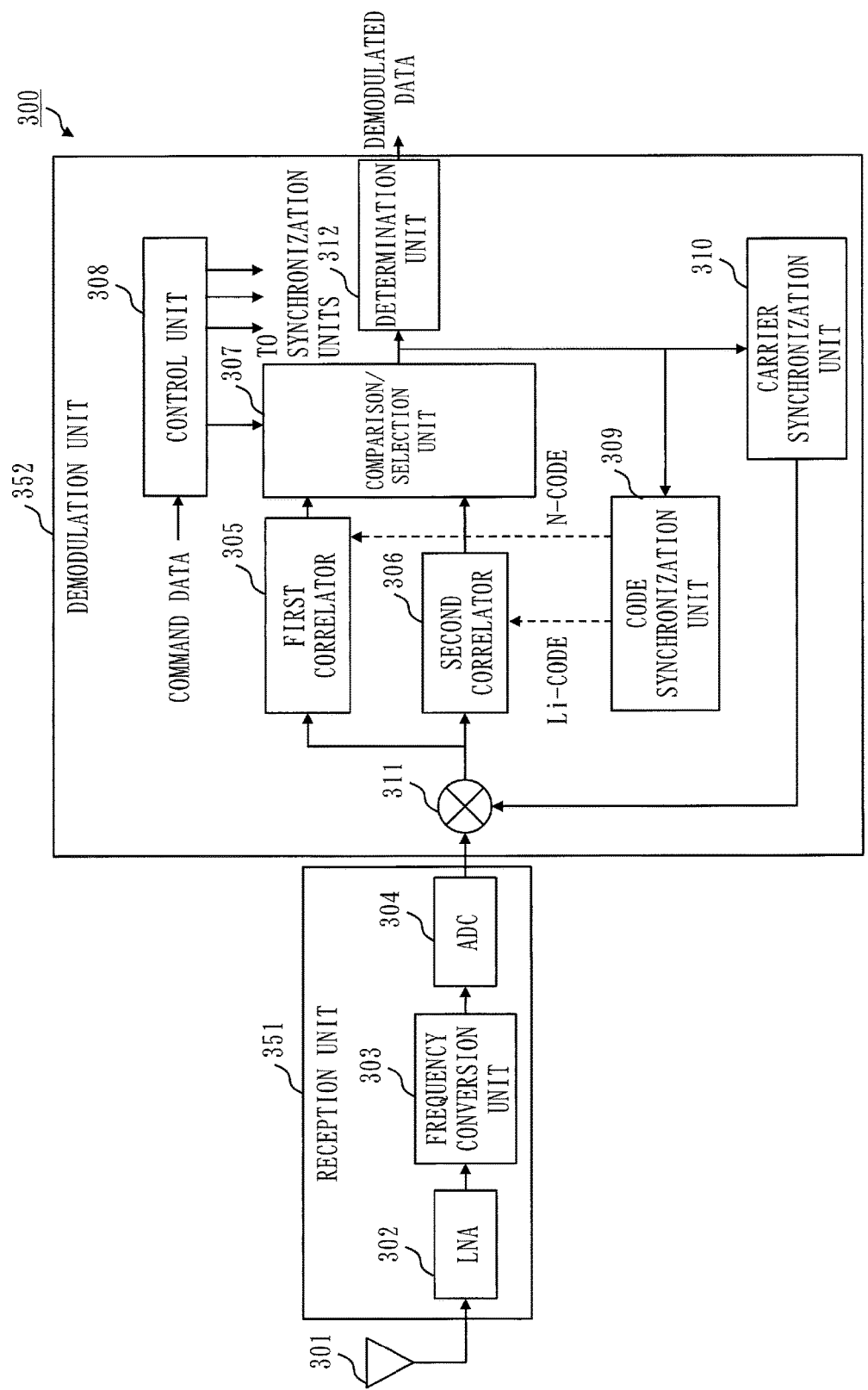
FIG. 3 is a block diagram illustrating a configuration of a receiver of the radio communication system according to the first embodiment.

As illustrated in FIG. 3, the receiver 300 includes a reception antenna 301, a reception unit 351, and a demodulation unit 352. The reception unit 351 has a low noise amplifier (LNA) 302, a frequency conversion unit 303, and an analog to digital converter (ADC) 304. The demodulation unit 352 has a first correlator 305, a second correlator 306, a comparison/selection unit 307, a control unit 308, a code synchronization unit 309, a carrier synchronization unit 310, a complex multiplier 311, and a determination unit 312.

\*\*\*Description of Operation\*\*\*

Operation of the radio communication system 100 according to the present embodiment will be described with reference to FIGS. 1 to 5. The operation of the radio communication system 100 corresponds to a radio communication method according to the present embodiment FIG. 1 illustrates a flow from a state in which TTC communication using a short-period spreading code is first performed until the state is switched to a state in which TTC communication using a long-period spreading code.

Step S11 represents procedures in setting an AES key. During command communication using a short-period spreading code, the ground station 101 informs the satellite station 102 of one of a plurality of AES keys that are provided in advance. After receiving a corresponding AES key code, the satellite station 102 sends telemetry informing of completion of AES key setting and of the received AES key code to the ground station 101.

Step S12 represents procedures of switching to a long-period spreading code. Upon recognizing that the transmitted AES key code matches with the AES key code received from the satellite station 102 and that the setting of the AES key is thus completed, the ground station 101 switches to transmission using a long-period spreading code based on the AES key during synchronization with a short-period spreading code. The timing of this switching will be explained later with reference to FIG. 5.

Step S13 represents procedures of informing of completion of long-period spreading code synchronization. The satellite station 102 performs synchronization with a signal spread with a long-period spreading code by using a long-period spreading code replica generated with the AES key, and transmits a telemetry signal informing of synchronization with the long-period spreading signal to the ground station 101 when the synchronization is completed. This concrete synchronization method will also be explained later.

Note that a change to a new AES key is also performed similarly to the procedures described above. Specifically, procedures in steps S11' to S13' are performed.

Step S11' represents procedures in setting a new AES key. During command communication using a long-period spreading code using the AES key being currently used, the ground station 101 informs the satellite station 102 of a new key different from the AES key being currently used from the AES keys provided in advance. After receiving a corresponding new AES key code, the satellite station 102 sends telemetry informing of completion of AES key setting and of the received AES key code to the ground station 101.

Step S12' represents procedures of switching to a new long-period spreading code. Upon recognizing that the transmitted AES key code matches with the AES key code received from the satellite station 102 and that the setting of the AES key is thus completed, the ground station 101 switches to transmission using a long-period spreading code based on the new AES key during synchronization with the current long-period spreading code.

Step S13' represents procedures of informing completion of new long-period spreading code synchronization. The satellite station 102 performs synchronization with a signal spread with a new long-period spreading code from the ground station 101 by using a long-period spreading code replica generated on the basis of the new AES key, and transmits a telemetry signal informing of synchronization with the new long-period spreading signal to the ground station 101 when the synchronization is completed.

Figure 4:
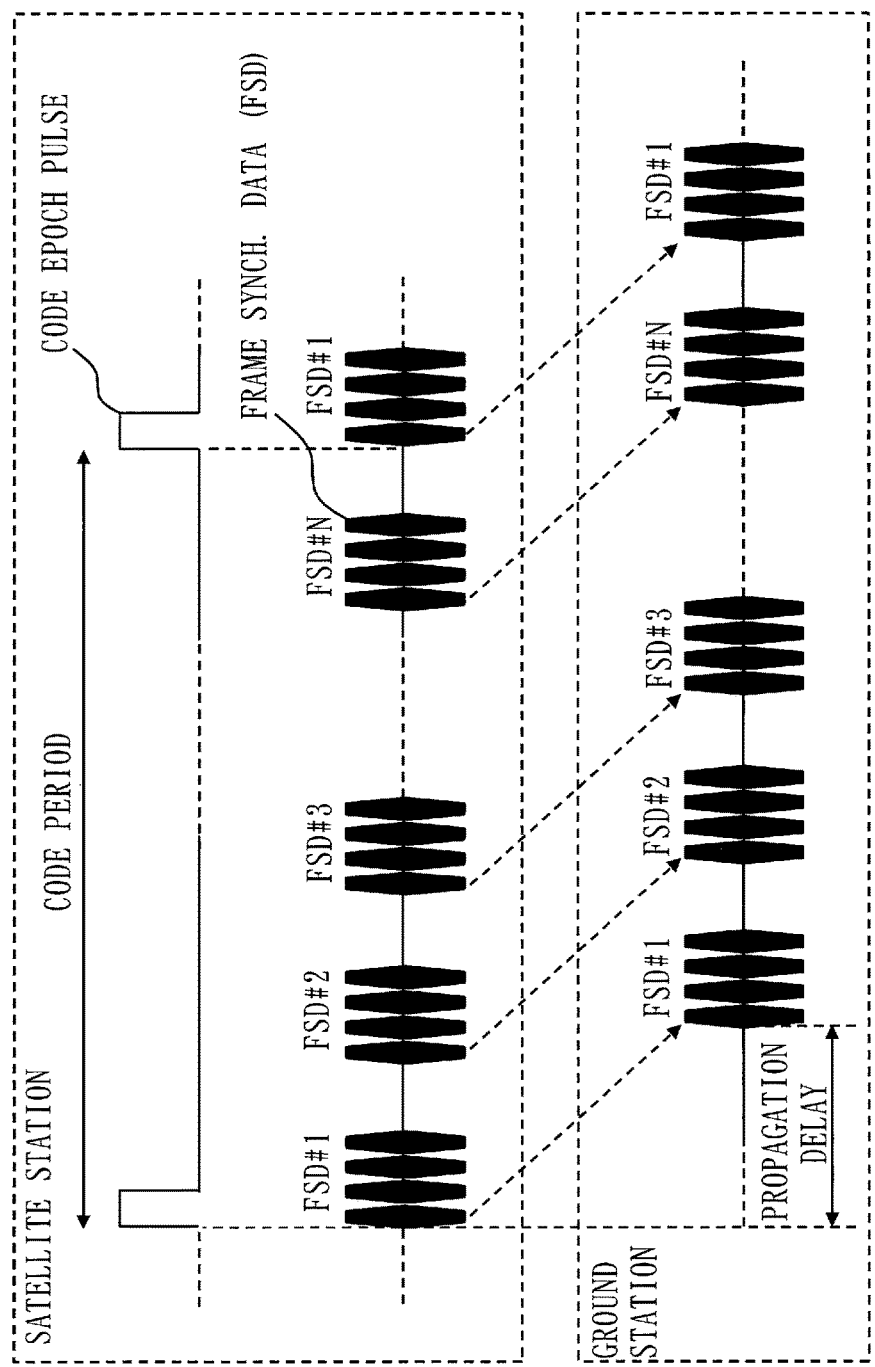
FIG. 4 is a diagram illustrating periodic FSD transmission in a synchronization flow of a transponder of the related art.

As described above, the radio communication system 100 is a system in which the satellite station 102 synchronizes with the transmission timing of the long-period spreading code generated by the ground station 101, which is significantly different from a system in which a ground station synchronizes with the transmission timing of FSD generated by a satellite station as described in Non Patent Literature 1. Transmission of periodic FSD in a synchronization flow of the related art is illustrated in FIG. 4. As illustrated in FIG. 4, periodic FSD transmission from the satellite station to the ground station is performed, and adjustment of transmission timing based on a propagation delay between the satellite station and the ground station is performed. In the present embodiment, the satellite station 102 need not perform these procedures relating to FSD transmission.

Operation of the transmitter 200 of the ground station 101 will be described with reference to FIG. 2.

The modulation unit 252 modulates a first signal, which includes information for the receiver 300 to identify a second spreading code, by performing spread spectrum using a first spreading code. The modulation unit 252 also modulates a second signal to be transmitted after the first signal by performing spread spectrum using a second spreading code. Specifically, the first spreading code is a short-period spreading code. The second spreading code is a spreading code with a code period longer than that of the first spreading code, which is, specifically, a long-period spreading code. The code period of the long-period spreading code is preferably about 40 years. In the present embodiment, the information included in the first signal is information for identifying a common encryption key held by the receiver 300 and the transmitter 200, and the second spreading code is data encrypted with the encryption key. The information included in the first signal is, specifically, an AES key code.

In the present embodiment, the modulation unit 252 switches from the first spreading code to the second spreading code at a tuning when any of code periods of the first spreading code starts. In an example of FIG. 5, which will be described later, the modulation unit 252 switches from the short-period spreading code to the long-period spreading code at the timing when the fourth code period starts.

The transmission unit 251 sequentially transmits signals modulated by the modulation unit 252 to the receiver 300.

In the present embodiment, the transmission unit 251 sequentially transmits the signals modulated by the modulation unit 252 to the receiver 300 via the transmission antenna 201.

Operation of the receiver 300 of the satellite station 102 will be described with reference to FIG. 3.

The reception unit 351 sequentially receives modulated signals resulting from spread spectrum from the transmitter 200. In the present embodiment, the reception unit 351 sequentially receives the signals modulated in the transmitter 200 from the transmitter 200 via the reception antenna 301.

The demodulation unit 352 demodulate the first signal, which includes the information for identifying the second spreading code, received by the reception unit 351 by despreading using the first spreading code. The demodulation unit 352 identifies the second spreading code on the basis of the information obtained from the first signal. The demodulation unit 352 then demodulates the second signal received after the first signal by the reception unit 351 by despreading using the second spreading code. As described above, the first spreading code is, specifically, the short-period spreading code. The second spreading code is, specifically, the long-period spreading code. In the present embodiment, the information included in the first signal is information for identifying a common encryption key held by the receiver 300 and the transmitter 200, and the second spreading code is data encrypted with the encryption key. The information included in the first signal is, specifically, an AES key code.

Figure 5:
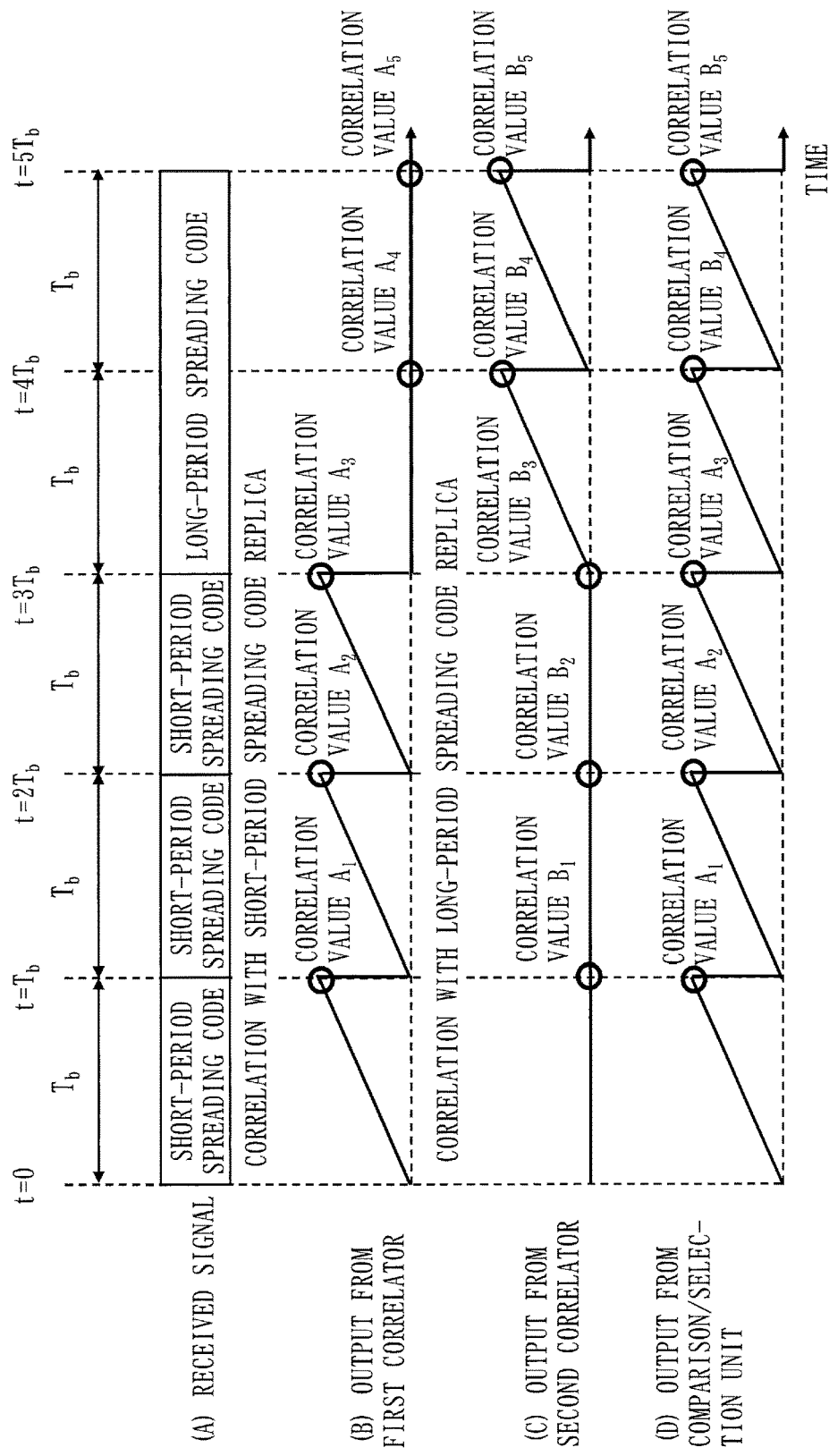
FIG. 5 is a diagram illustrating an example of outputs of correlation values in a receiver of a radio communication system according to the first embodiment.

In the present embodiment, the demodulation unit 352 performs a first correlation process using a first code replica corresponding to the first spreading code and a second correlation process using a second code replica corresponding to the second spreading code on the signals received by the reception unit 351. The demodulation unit 352 detects time at which switching from the first spreading code to the second spreading code was performed by the transmitter 200 on the basis of a first correlation value obtained through the first correlation process and a second correlation value obtained through the second correlation process. The demodulation unit 352 then switches from the first spreading code to the second spreading code at time corresponding to the detected time. The first code replica is, specifically, a short-period spreading code replica "N-code". The second code replica is, specifically, a partial spreading code replica "Li-code" (i=1, 2, 3, . . . ) of the long-period spreading code. In the example of FIG. 5 described later, the demodulation unit 352 detects that the time at which switching from the short-period spreading code to the long-period spreading code was performed by the transmitter 200 is $3T_b$ on the basis of correlation values obtained through correlation processes using the first correlator 305 and the second correlator 306.

Details of the operation of the receiver 300 will be described below.

An analog signal received by the reception antenna 301 is amplified to a desired power by the low noise amplifier 302. The frequency conversion unit 303 converts the frequency of a signal output from the low noise amplifier 302 from a radio frequency (RF) to a baseband frequency. An analog signal output from the frequency conversion unit 303 is sampled and converted into a digital signal by the analog to digital converter 304.

Before completion of setting an AES key from the ground station 101 to the satellite station 102 in step S11 of FIG. 1, TTC communication using the short-period spreading code is being performed as described above.

The first correlator 305 is a correlator for despreading a signal spread with the short-period spreading code and performs a correlation process using the short-period spreading code replica "N-code". Thus, before completion of setting an AES key from the ground station 101 to the satellite station 102, only the first correlator 305 operates and the subsequent comparison/selection unit 307 unconditionally selects and outputs code correlation information from the first correlator 305. This control is performed by the control unit 308.

An output from the comparison/selection unit 307 is input to the code synchronization unit 309 and the carrier synchronization unit 310. The receiver 300 of the satellite station 102 in the present embodiment adjusts the code phase of the short-period spreading code replica "N-code" of the code synchronization unit 309 and a correction value for a frequency error output from the carrier synchronization unit 310 until high correlation between the received signal and the short-period spreading code replica "N-code" generated in the receiver 300 is obtained from the first correlator 305. The frequency error correction value output from the carrier synchronization unit 310 is a complex number, which is multiplied by a received digital baseband signal by the complex multiplier 311, so that the received frequency is shifted in the baseband. The receiver 300 of the satellite station 102 in the present embodiment establishes carrier synchronization by feedback loop control of shifting the frequency in this manner to detect a frequency correction value with which a high correlation value is obtained. In parallel with this carrier synchronization process, the receiver 300 of the satellite station 102 in the present embodiment establishes code synchronization by feedback loop control of changing the code phase of the short-period spreading code replica "N-code" output from the code synchronization unit 309 over one period of the short-period spreading code in every frequency shift process, so as to detect a code phase with which a high correlation value, that is, a correlation peak is obtained and controlling the short-period spreading code replica "N-code" to the code phase.

The receiver 300 of the satellite station 102 in the present embodiment performs synchronization tracking of retaining synchronization by using such a technology as a delay-locked loop (DLL) even after establishment of synchronization with the short-period spreading code.

The determination unit 312 determines demodulated data {0,1} from the sign (+/−) of a correlation peak value after establishment of synchronization, and outputs the determination result as demodulated data.

Subsequently, after the AES key setting process in step S11 of FIG. 1 described above is completed using TTC communication using such a short-period spreading code, the ground station 101 switches spread spectrum with the short-period spreading code to that with the long-period spreading code at a timing of one of times in units of an integer multiple of the period of the short-period spreading code.

FIG. 5 illustrates an example of the switching timings. (A) of FIG. 5 illustrates spread spectrum signals received at the satellite station 102, and also the timings of the spreading codes used for spread spectrum.

When the period of the short-period spreading code is represented by $T_b$, a process of switching to spread spectrum with the long-period spreading code immediately after spread spectrum with the first three short-period spreading codes, that is, after a time of $3T_b$ is performed in the ground station 101 in the example of FIG. 5. Note that this switching to the long-period spreading code is not limited to the example of FIG. 5 but may be performed at any time $T_i = T_b \times i$ (i=1, 2, 3, . . . ).

After the AES key setting process is completed, the control unit 308 of the receiver 300 of the satellite station 102 performs control to make the second correlator 306 operate in parallel with the first correlator 305. At the same time, the control unit 308 also sends an instruction to the comparison/selection unit 307 to switch from an operation of unconditionally selecting and outputting code correlation information from the first correlator 305 to an operation of selecting and outputting correlation information with the higher correlation value from the correlation information from the first correlator 305 and that from the second correlator 306.

FIG. 5 illustrates an example of the operations. Upon acquisition of a long-period spreading code, the second correlator 306 performs a correlation process using a partial spreading code replica "L1-code" in a section for a period $T_b$, which is equal to the period of the short-period spreading code, from the beginning of the long-period spreading code in synchronization with the timing of the short-period spreading code with which synchronization is already established.

In the example of FIG. 5, as illustrated, time $t=\{0, T_b, 2T_b, 3T_b, \ldots\}$ is the timing of the short-period spreading code, and in this case, the second correlator 306 performs cross correlation with received signals using the partial spreading code replica "L1-code", which is the beginning part of the long-period spreading code, in synchronization with the time $t=\{0, T_b, 2T_b, 3T_b, \ldots\}$.

From time 0 to time $3T_b$, since the received signal is spread with the short-period spreading code, high correlation values are obtained as correlation values $A_1$, $A_2$, and $A_3$ with the short-period spreading code replica "N-code" obtained by the first correlator 305 as indicated by circles in (B) of FIG. 5. In the meantime, as indicated by circles in (C) of FIG. 5, low correlation values are obtained as correlation values $B_1$, $B_2$, and $B_3$ with the partial spreading code replica "L1-code", which corresponds to the beginning part of the long-period spreading code, obtained by the second correlator 306.

In contrast, from time $3T_b$ to time $4T_b$, since the received signal is spread in a section of one $T_b$ from the beginning of the long-period spreading code, a low correlation value is obtained as a correlation value $A_4$ with the short-period spreading code replica "N-code" obtained by the first correlator 305 as illustrated in (B) of FIG. 5. In the meantime, as illustrated in (C) of FIG. 5, a high correlation value is obtained as a correlation value $B_4$ with the partial spreading code replica "L1-code", which corresponds to the beginning part of the long-period spreading code, obtained by the second correlator 306.

The subsequent comparison/selection unit 307 selects and outputs correlation information with the higher correlation value from the correlation information output from the first correlator 305 and that output from the second correlator 306. Thus, as illustrated in (D) of FIG. 5, from time 0 to time $4T_b$, the outputs are in the order of the correlation values $A_1$, $A_2$, $A_3$, and $B_4$, and high correlation values are continuously input to the subsequent determination unit 312, carrier synchronization unit 310, and code synchronization unit 309 even immediately after switching to the long-period spreading code, which maintains stable demodulation and synchronization processes.

In addition, after starting the operation of selecting and outputting the higher of such two correlation values, the comparison/selection unit 307 continues to select values from the first correlator 305 for a while as illustrated in FIG. 5, but selects a value from the second correlator 306 for the first time at time t=$4T_b$, and then sends an instruction to the code synchronization unit 309 to update the spreading code replica "L1-code" with a spreading code replica "L2-code". This instruction is performed via the control unit 308.

The spreading code replica "L1-code" is a partial spreading code in the section of one period $T_b$, which is equal to the period of the short-period spreading code, from the beginning of the long-period spreading code, and the spreading code replica "L2-code" is a partial spreading code in a section of the next one period $T_b$ following the spreading code replica "L1-code".

From time $4T_b$ to time $5T_b$ in the example of FIG. 5, the received signal is spread with the "partial spreading code in a section of the next one period $T_b$", but as a result of the instruction to update from the spreading code replica "L1-code" to the spreading code replica "L2-code", a high value is obtained as the correlation value $B_5$ between the partial spreading code replica "L2-code" and the received signal obtained by the second correlator 306, similarly to the correlation value $B_4$, as illustrated in (C) of FIG. 5.

In contrast, as illustrated in (B) of FIG. 5, a low correlation value is obtained as a correlation value $A_5$ between the short-period spreading code replica "N-code" obtained by the first correlator 305 and the received signal spread with the "partial spreading code in a section of the next one period $T_b$".

Thus, as illustrated in (D) of FIG. 5, the comparison/selection unit 307 is also capable of selecting the high correlation value $B_5$ output from the second correlator 306 and supplying the correlation value $B_5$ to the subsequent determination unit 312, carrier synchronization unit 310, and code synchronization unit 309 at time $5T_b$.

Since the receiver 300 of the present embodiment performs the process of extracting only high correlation values even time $T_b$ after switching to the long-period spreading code in this manner, stable demodulation and synchronization processes are also maintained at time $5T_b$.

When the comparison/selection unit 307 has started to select an output from the second correlator 306 in this manner, the control unit 308 stops the operation of the first correlator 305, and at the same time, sends an instruction to the comparison/selection unit 307 to switch from the operation of selecting and outputting correlation information with the higher correlation value from correlation information from the first correlator 305 and that from the second correlator 306 to the operation of unconditionally selecting and outputting correlation information from the second correlator 306.

In addition, when a partial spreading code replica of a section (i=1, 2, 3, . . . ) starting time $T_b \times (i-1)$ after the beginning of the long-period spreading code and ending time $T_b \times i$ after the beginning is represented by "Li-code" (i=1, 2, 3, . . . ), the control unit 308 gives an instruction to the code synchronization unit 309 to continue updating processes for "L3-code", "L4-code", "L5-code", . . . at subsequent time t={$5T_b$, $6T_b$, $7T_b$, . . . } similarly to the updating process from "L1-code" to "L2-code".

According to the flow described above, the satellite station 102 transmits a telemetry signal informing of synchronization with a long-period spreading signal from the ground station 101 to the ground station 101 when the synchronization is completed.

According to the series of operations and controls as described above, the receiver 300 of the present embodiment is capable of continuously obtaining high correlation values from the second correlator 306 even when the short-period spreading code is switched to the long-period spreading code and also after the switching. Thus, synchronization is not lost at switching and demodulated data are not erroneous, that is, time for synchronization is not required at switching, and stable synchronization tracking and demodulation processes are continuously performed on received signals spread with the long-period spreading code even after switching from the short-period spreading code to the long-period spreading code is completed unless the received signals are interrupted.

Note that, in a case where both of correlation values output from the first correlator 305 and the second correlator 306 are low owing to the influence of noise or the like, the comparison/selection unit 307 may make an erroneous selection. Specifically, the following two errors may occur:

(a) a case in which it is erroneously determined that a signal spread with a short-period spreading code is received although the beginning part of a signal spread with a long-period spreading code is received; and (b) a case in which it is erroneously determined that the beginning part of a signal spread with a long-period spreading code is received although a signal spread with a short-period spreading code is received.

In a modification, the receiver 300 of the present embodiment may therefore be provided with a function described below to detect such erroneous determination and avoid the influence.

In the present embodiment, when a condition of "$A_i < B_i$" occurs once, where $A_i$ represents a correlation value output from the first correlator 305 and $B_i$ represents a correlation value output from the second correlator 306 (i=1, 2, 3, . . . ), the operation of the first correlator 305 is stopped, and at the same time, the comparison/selection unit 307 switches to the operation of unconditionally selecting and outputting correlation information from the second correlator 306.

In contrast, in the present modification, an average value $\Sigma A_i$ of $A_i$ and an average value $\Sigma B_i$ of $B_i$ are compared, results of averaging are compared, and when a condition of "$\Sigma A_i < \Sigma B_i$" is satisfied, the operation of the first correlator 305 is stopped, and at the same time, the comparison/selection unit 307 switches to the operation of unconditionally selecting and outputting correlation information from the second correlator 306. This reduces occurrence of erroneous determination (a) and (b) described above. Furthermore, in addition to the condition of "$\Sigma A_i < \Sigma B_i$", one or more of a condition "max($\Sigma A_i$, $\Sigma B_i$)>$P_{th}$" that the larger value max($\Sigma A_i$, $\Sigma B_i$) of $\Sigma A_i$ and $\Sigma B_i$ exceeds a certain value $P_{th}$, a condition "($\Sigma B_i - \Sigma A_i$)>$P_s$" that the difference between $\Sigma A_i$ and $\Sigma B_i$ exceeds a certain value $P_s$, and a condition "($\Sigma B_i / \Sigma A_i$)>$P_d$" that the ratio of $\Sigma A_i$ and $\Sigma B_i$ exceeds a certain value $P_d$ may be added to the condition for the switching of the operation.

For example, even when the condition of "$A_i < B_i$" occurs once, the event of "$A_i < B_i$" can be determined to be because of the erroneous determination (b) described above if the result of subsequent comparison of average values is "$\Sigma A_i > \Sigma B_i$".

Furthermore, when erroneous determination (a) described above occurs, the timing for starting update of the spreading code replica "Li-code" (i=1, 2, 3, . . . ) is missed, both the correlation value $A_i$ and the correlation value $B_i$ thus become small values and the synchronization of the receiver 300 is lost thereafter. This erroneous determination is detected when a condition "max($\Sigma A_i$, $\Sigma B_i$)$\leq P_{th}$" that the larger value max($\Sigma A_i$, $\Sigma B_i$) of the average values does not exceed the value $P_{th}$, a condition "$\Sigma B_i - \Sigma A_i \leq P_s$" that the difference between the average values does not exceed the value $P_s$, or a condition "$\Sigma B_i / \Sigma A_i \leq P_d$" that the ratio of the average value does not exceed the value $P_d$ is satisfied.

In a case where the receiver 300 has detected the erroneous determination (a) described above or loss of synchronization occurs as described above, the satellite station 102 requests the ground station 101 to return to the spread spectrum using the previous short-period spreading code. At the same time, the satellite station 102 switches to an operation of acquiring a signal spread with the short-period spreading code by using the first correlator 305 only. The ground station 101 in receipt of the request performs the spread spectrum with the previous short-period spreading code, and when satellite station 102 has become synchronous with the short-period spreading code, switches again to the long-period spreading code at the timing of the synchronization with the short-period spreading code according to the flow from step S12 of FIG. 1. As a result of such procedures, even when the erroneous determination (a) described above occurs, the satellite station 102 achieves resynchronization with the long-period spreading code similarly to the series of synchronization processes described above after synchronization with a spread spectrum signal using the short-period spreading code again.

Alternatively, the ground station 101 may monitor whether or not the erroneous determination (a) described above has occurred or whether or not loss of synchronization has occurred by using telemetry lines, and when the erroneous determination (a) described above is determined to have occurred, the ground station 101 itself may return the spreading code to the short-period spreading code and cause the satellite station 102 to resynchronize without waiting for the request from the satellite station 102. In this case as well, resynchronization with the long-period spreading code can be achieved thereafter by processes according to the flow in step S12 and subsequent step in FIG. 1.

Alternatively, the receiver 300 may calculate backward the time of switching to the long-period spreading code from the time when the erroneous determination (a) described above was detected, further identify the spreading code replica "Li-code" being currently used for the received signal on the basis of the calculation result, and attempt synchronization with the long-period spreading code by itself by using the identified spreading code replica "Li-code".

A method of the "backward calculation" will be described here.

When the spreading code is switched to the long-period spreading code, the correlation value $A_i$ of the short-period spreading code significantly lowers thereafter as illustrated in FIG. 5. When switching of the long-period spreading code cannot be correctly detected and the timing for starting update of the spreading code replica "Li-code" (i=1, 2, 3, . . . ) is missed, the correlation value $B_i$ of the long-period spreading code also retains a small value. Such characteristics may be used for back calculation of the time of switching to the long-period spreading code. For example, a circuit to obtain a moving average of five $A_i$ is additionally provided to generate a data series $\Sigma A_i$ resulting from the moving average of $A_i$, and similarly, a circuit to obtain a moving average of five $B_i$ is additionally provided to generate a data series $\Sigma B_i$ resulting from the moving average of $B_i$. In this case, the erroneous determination (a) described above is detected under the condition "max($\Sigma A_i$, $\Sigma B_i$)$\leq P_{th}$" on the basis of the aforementioned characteristics. Note that, when $P_{th}$ is set to 0.5 for a correlation level in a normal state in which synchronization is established, and in a case where a circuit to obtain a moving average of five $\{A_i, B_i\}$ is provided, the switching to the long-period spreading code is predicted to have occurred three periods before the time at which "max($\Sigma A_i$, $\Sigma B_i$)$\leq P_{th}$" is satisfied, that is, at time $3T_b$. In this case, the signal that is currently received is estimated to have been spread with a spreading code replica "L4-code" since time $4T_b$ has already been passed from switching to the long-period spreading code. Thus, the receiver 300 can establish synchronization with the long-period spreading code by attempting resynchronization with the spreading code replica "L4-code". Furthermore, in a case where the predicted value of the switching time is assumed to include error, resynchronization using spreading code replicas of $\pm 1T_b$ or $\pm 2T_b$ before or after the spreading code replica "L4-code" such as "L3-code" and "L5-code" in addition to the spreading code replica "L4-code" may also be attempted at the same time. In this case, since the correlation value $B_i$ becomes a large value when a spreading code replica associated with the received signal is selected from these replicas, the receiver 300 may finally select a spreading code replica with the largest average value of $B_i$. This process improves the probability of succeeding in resynchronization as compared to a case in which resynchronization is attempted with only one spreading code replica.

While the example of moving average of five has been described here, a circuit to obtain a moving average of (2M+1) $\{A_i, B_i\}$ may similarly be provided (M= 1, 2, 3, . . . ), and in this case, switching to the long-period spreading code is predicted to have occurred (M+1) periods before the time at which "max($\Sigma A_i$, $\Sigma B_i$)$\leq P_{th}$" is satisfied, that is, at time ((M+1)$\times T_b$).

Note that such resynchronization procedures are similarly applicable to a case in which a received signal is instantaneously interrupted during operation owing to certain influence after the receiver 300 has synchronized with the long-period spreading code and resynchronization with long-period spreading code occurs, in addition to the case in which detection of the timing of switching to the long-period spreading code is failed as described above.

Furthermore, on the assumption that such resynchronization may occur, data transmitted for a while, that is, specifically, several bits to several tens of bits, after switching to the long-period spreading code in the ground station 101 may be data other than actual data, such as preamble, so that the influence of data error on the system caused until resynchronization will be removed.

As described above, in the modification of the present embodiment, upon detecting the time at which switching from the first spreading code to the second spreading code was performed by the transmitter 200, the demodulation unit 352 of the receiver 300 averages the first correlation values, averages the second correlation values, and determines whether the detected time is correct or erroneous on the basis of the results of averaging. If the detected time is determined to be erroneous, the demodulation unit 352 estimates the correct time at which the switching from the first spreading code to the second spreading code was performed by the transmitter 200 on the basis of the numbers of samples for the averaging of the first correlation values and the second correlation values. The demodulation unit 352 then performs switching from the first spreading code to the second spreading code at time corresponding to the estimated time. In other words, the demodulation unit 352 performs resynchronization with the second spreading code.

Next, a method for dealing with the erroneous determination (b) described above will be described.

Since the erroneous determination (b) described above is a state in which update of the spreading code replica "Li-code" (i=1, 2, 3, . . . is erroneously performed inside the receiver 300, the spreading code replica "Li-code" once needs to be returned to the initial value "L1-code", that is, the beginning part of the long-period spreading code.

Thus, if the receiver 300 has detected the erroneous determination (b) described above, control for stopping the operation of updating the spreading code replica "Li-code" (i=1, 2, 3, . . . ) performed by the code synchronization unit 309 and returning the spreading code replica "Li-code" to the initial value "L1-code" again is performed via the control unit 308. Alternatively, the ground station 101 may monitor whether or not such erroneous determination has occurred by using telemetry lines, and may perform control to return the spreading code replica "Li-code" to the initial value "L1-code" by using a command signal using the short-period spreading code with which synchronization is established.

As described above, since the radio communication system 100 according to the present embodiment includes two correlators, which are the first correlator 305 and the second correlator 306, in the receiver 300, which is a demodulator, and since the parallel processing allows the more probable correlation information to be obtained with the timing of switching the long-period spreading code being at any time point $t=T_b \times i$ (i=1, 2, 3, . . . ) in units of an integer multiple of the period of the short-period spreading code, the demodulation process and the synchronization process are not lost at switching, that is, time for synchronization is not required at switching, and stable synchronization tracking and demodulation processes are continued even after switching from the short-period spreading code to the long-period spreading code is completed. In addition, since the present embodiment is a technique for the satellite station 102 to adjust to the switching timing of the ground station 101 as described above, the need for FSD transmission, which is necessary for the ground station 101 to adjust to the timing of the satellite station 102 as in the related art, is eliminated. Thus, the synchronization procedures after switching to the AES mode are simple, and at the same time, an effect that the possibility of being subjected to communication jamming due to pulse jamming from third parties on the ground based on the FSD transmission timing is eliminated is produced.

Furthermore, with the synchronization method of the related art, range measurement for tracking cannot be performed until synchronization with the long-period spreading code is established because Ich is used for transmission of FSD; with the radio communication system 100 of the present embodiment, however, there is no such constraint and range measurement can always be performed since FSD transmission is not necessary.

Furthermore, even if the receiver 300 has erroneously determined the switching timing of the long-period spreading code or if synchronization is lost during reception of the long-period spreading code, the control for quickly returning to the initial state and the control of performing resynchronization allow secure synchronization with the long-period spreading code to be achieved.

While the present embodiment has been described above with reference to the example of application to a satellite communication system in which instructions are transmitted from the ground station 101 to the satellite station 102 over command lines and the state of the satellite station 102 is monitored over telemetry lines, the present embodiment is widely applicable to other radio communication systems that remotely control radio terminals by using spread spectrum. For example, the radio communication system is a system that wirelessly control an unmanned aerial vehicle (UAV), a drone, an unmanned ship, a robot, or the like, and application of the present embodiment allows the radio communication system to achieve secure communication.

Furthermore, while the description herein focuses on improvement of the security of command signals, the signals are not limited to command signals, but improvement in the security of audio signals resulting from modulation in spread spectrum techniques or data communication signals can similarly be achieved. For example, the present embodiment is also widely applicable to a satellite communication system in which a mobile terminal such as an aircraft and a control station transmit and receive data and audio by using spread spectrum via a satellite, and a radio communication system in which a portable terminal and a base station communicate with each other directly without a satellite by using spread spectrum. In these systems, secure communication is similarly achieved.

*Description of Effects of Embodiment*

According to the present embodiment, switching from a short-period spreading code to a long-period spreading code is accelerated.

In the present embodiment, the ground station 101 applies spread spectrum to transmission data, and transmits signals resulting from the spread spectrum as spread spectrum transmission signals. The satellite station 102 receives and demodulates the spread spectrum transmission signals. The ground station 101 first performs spread spectrum using the short-period spreading code, switches the spreading code being used from the short-period spreading code to the long-period spreading code at time tA of synchronization with a timing of the period of the short-period spreading code, and subsequently performs spread spectrum using the long-period spreading code. The satellite station 102 uses synchronization information of synchronization with the short-period spreading code to detect the switching time tA, and uses information of the detected switching time tA to synchronize with the long-period spreading code. According to the present embodiment, periodic transmission of FSD from the satellite station 102 is not needed, which eliminates the possibility of the synchronization process with the long-period spreading code being disturbed by third parties and allows continuous transition from the state in synchronization with the short-period spreading code to synchronization with the long-period spreading code without requiring time of several seconds for switching to the long-period spreading code and establishment of synchronization.

*Other Configurations*

While the radio communication system 100 is a satellite communication system including the ground station 101 having the transmitter 200 and the satellite station 102 having the receiver 300 in the present embodiment, the present embodiment is generally applicable to radio communication systems using spread spectrum communication. Specifically, the present embodiment is applicable not only to satellite communication systems but also to various radio communication systems such as aircrafts, unmanned aerial vehicles, portable terminals, ships, railways, and unmanned vehicles, and provides a secure communication method in any of these systems.

Second Embodiment

The description of the present embodiment will focus on differences from the first embodiment.

Although the short-period spreading code length $T_b$ and the data bit length $T_d$ are assumed to be equal in the first embodiment, there can be many cases where $T_b$ and $T_d$ are not necessarily equal to each other depending on systems.

Thus, in the present embodiment, the following is performed, so that effects similar to those of the first embodiment are produced even in the case of the relation $T_b \neq T_d$.

In the present embodiment, the technology described in Patent Literature 1 is applied. Since this technology is used at the same time, correlation values are obtained in units of bit periods $T_d$, and thus synchronization with the long-period spreading code is achieved similarly to the first embodiment.

Figure 6:
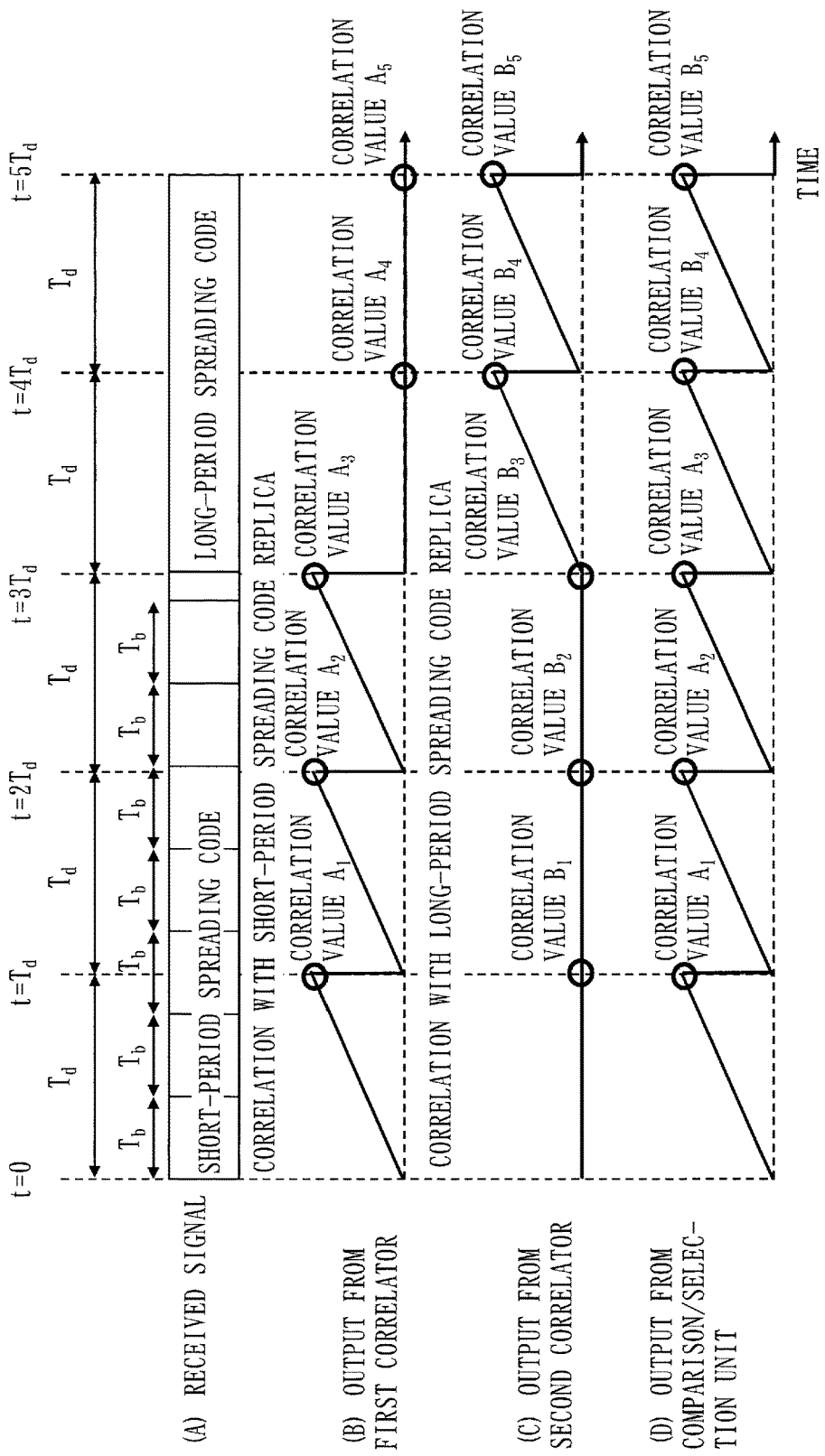
FIG. 6 is a diagram illustrating an example of outputs of correlation values in a receiver of a radio communication system according to a second embodiment.

FIG. 6 illustrates one example of operation in a case where the relation between the short-period spreading code period $T_b$ and the bit period $T_d$ is expressed by $T_d=2.4 \times T_b$. As illustrated in FIG. 6, as a result of applying the technology described in Patent Literature 1, correlation values $A_i$ and $B_i$ are obtained in the bit period $T_d$. As is clear in FIG. 6, the only difference from the example of FIG. 5 is that the period in which the correlation values $A_i$ and $B_i$ are obtained is the bit period $T_d$ instead of the short-period spreading code period $T_b$. Thus, in the case of $T_b \neq T_d$ in this manner, the ground station 101 is capable of maintaining synchronization at switching to the long-period spreading code and achieving stable data demodulation similarly to the case of $T_b = T_d$ as in the example of FIG. 4 by switching from the short-period spreading code to the long-period spreading code at a timing of a time point $t=T_d \times i$ ($i=1, 2, 3, \ldots$), which is an integer multiple of the bit period $T_d$ instead of $T_b$, as illustrated in FIG. 6.

In addition, since the present embodiment is also applicable in the case of the relation of $T_b \neq T_d$ as described above, the present embodiment can also be applied under such a condition that the bit rate can be freely set depending on the line condition.

As described above, in the present embodiment, signals modulated by the modulation unit 252 of the transmitter 200 are signals of data constituted by a plurality of bit strings each having a fixed length. The modulation unit 252 switches from the first spreading code to the second spreading code at the beginning of any of the plurality of bit strings. In the example of FIG. 6, the modulation unit 252 switches from the short-period spreading code to the long-period spreading code at the timing of the beginning of the fourth bit string.

Third Embodiment

The description of the present embodiment will focus on differences from the first embodiment.

A configuration of a receiver 300 of a radio communication system 100 according to the present embodiment will be described with reference to FIG. 7.

While the first embodiment has a configuration in which two correlators are provided in the receiver 300 as illustrated in FIG. 3, the number of correlator in the receiver 300 is reduced to one to make the receiver 300 smaller in the present embodiment.

Specifically, in the first embodiment, the ground station 101 performs the process of synchronizing with the long-period spreading code by using two correlators by the receiver 300 without informing the satellite station 102 of the time of switching to the long-period spreading code. In contrast, in the present embodiment, the ground station 101 informs the satellite station 102 of the time of switching to the long-period spreading code, which allows the number of correlators in the receiver 300 to be reduced to one from two.

Figure 7:
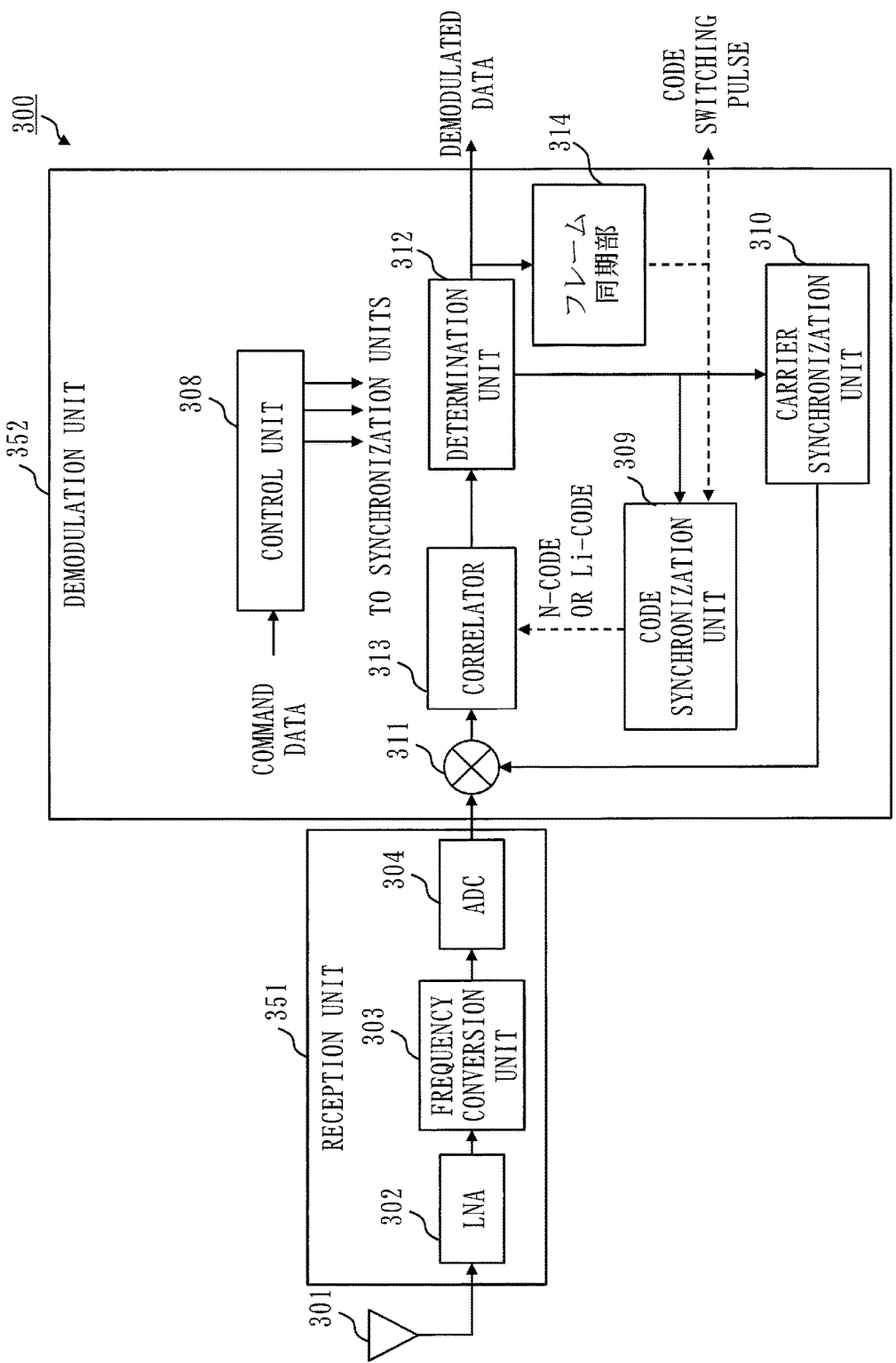
FIG. 7 is a block diagram illustrating a configuration of a receiver of a radio communication system according to a third embodiment.

As illustrated in FIG. 7, a demodulation unit 352 of the receiver 300 in the present embodiment includes only one correlator 313. Thus, the comparison/selection unit 307 illustrated in FIG. 3 is not needed.

A brief flow of procedures is as follows.

(1) The ground station 101 informs the satellite station 102 of information indicating the time Tx of switching to the long-period spreading code to be performed, at the same time as informing the satellite station 102 of the AES key, over command lines using the short-period spreading code.

(2) Upon receiving the information indicating the AES key code and the time Tx transmitted from the ground station 101, the satellite station 102 transmits telemetry informing of information indicating the received time Tx together with completion of AES key setting and the AES key code to the ground station 101.

(3) Upon confirming that the received AES key code and the information indicating the time Tx match the AES key code and the information indicating the time Tx transmitted to the satellite station 102, the ground station 101 switches the spreading code being used from the short-period spreading code to the long-period spreading code as scheduled at time Tx.

(4) At the same time, the satellite station 102 also switches the spreading code replica generated by the code synchronization unit 309 from the short-period spreading code replica "N-code" to the partial spreading code replica "Li-code" of the long-period spreading code at time Tx.

As a result of these procedures, the timing at which the code of the received spread spectrum signal input to the correlator 313 is switched and the timing at which the spreading code replica input to the correlator 313 is switched match with each other, which allows high correlation values to be obtained with the period of $T_b$ after switching of spreading codes, similarly to the first embodiment.

Note that the switching timings in the ground station 101 and in the satellite station 102 need to correctly match with each other in units of chips.

One method for achieving the matching is to perform switching both in the ground station 101 and in the satellite station 102 at time Tx on the basis of time information from a global positioning system (GPS).

In practice, a delay of time i from a signal is transmitted from the ground station 101 until the signal is input to the correlator 313 in the satellite station 102 is caused owing to a propagation delay, a delay in the transmitter 200, a delay in the receiver 300, and the like, the ground station 101 performs the process of switching the spreading code at time (Tx−τ) that is τ before time Tx.

In addition, the time (Tx−τ) at which the spreading code is switched is set to synchronize with the period $T_b$ of the short-period spreading code in the ground station 101. Specifically, the ground station 101 sets Tx so that a condition "Tx−τ=$T_b \times i$" ($i=1, 2, 3, \ldots$) is satisfied.

Alternatively, as another solution, the ground station 101 may inform the satellite station 102 of the switching timing by the means described below.

As illustrated in FIG. 7, the demodulation unit 352 of the receiver 300 of the present embodiment further includes a frame synchronization unit 314.

Normally, in radio communication, transmission data are transmitted in a frame format including a preamble and a header at the beginning. Making use of these characteristics, the ground station 101 performs switching to the long-period spreading code with a frame period, and informs the satellite station 102 in advance of the frame from which switching is performed.

Specifically, synchronization is established by the following procedures.

(1) The ground station 101 inserts frame numbers #i sequentially into header parts of transmission frames for transmitting command data (i=1, 2, 3, . . . ).

(2) The ground station 101 informs the satellite station 102 of an AES key over command lines using the frame structure and the short-period spreading code. The ground station 101 also informs in advance of the frame number #j from which the spreading code is switched to the long-period spreading code.

(3) Upon receiving the AES key code and the frame number #j transmitted from the ground station 101, the satellite station 102 transmits telemetry informing of the received frame number #j together with completion of AES key setting and the AES key code to the ground station 101.

(4) Upon confirming that the received AES key code and frame number #j match with the AES key code and frame number #j transmitted to the satellite station 102, the ground station 101 switches the spreading code to be used from the frame number #j to the long-period spreading code as scheduled. Note that the ground station 101 uses the short-period spreading code from a frame number #1 to a frame number #(j−1).

(5) The satellite station 102 uses the frame synchronization unit 314 to establish frame synchronization using preambles, which are known patterns included in demodulated data, and extracts frame numbers #i inserted in the headers by the ground station 101 from the received frame information.

(6) The satellite station 102 estimates the time at which a frame #j spread with the long-period spreading code will arrive from the frame numbers #i (i=1, 2, 3, . . . ) obtained during the demodulation process by the frame synchronization unit 314, and performs control to switch the spreading code replica generated by the code synchronization unit 309 from the short-period spreading code replica "N-code" to the partial spreading code replica "Li-code" the long-period spreading code when the signal with the frame number #j arrives.

According to these procedures, the satellite station 102 itself detects the timing of switching to long-period spreading code on the basis of the information of the frame number #j transmitted in advance from the ground station 101, which is advantageous in that estimation and adjustment of the delay time τ of a signal described above need not be performed.

In addition, since the frame length is an integer multiple of the code length of the short-period spreading code or an integer multiple of the bit length of transmission data, use of code timing and bit timing information obtained in the demodulation process allows the timing at which the frame number #j will arrive to be obtained with high accuracy of a level smaller than the chip period.

Thus, since the spreading code replica is also switched from the short-period spreading code replica "N-code" to the spreading code replica "Li-code" with high accuracy in synchronization with the timing at which the signal with the frame number #j is input in the correlator 313, high correlation values are obtained with the period $T_b$ after switching of the spreading codes, similarly to the first embodiment. As a result, the effects similar to those in the first embodiment are achieved with the receiver 300 having a configuration including one correlator.

As described above, in the present embodiment, the first signal including information for the receiver 300 to identify the second spreading code further includes the information indicating the time at which the modulation unit 252 of the transmitter 200 switches from the first spreading code to the second spreading code. The demodulation unit 352 of the receiver 300 detects the time at which the transmitter 200 switches from the first spreading code to the second spreading code on the basis of the information.

Alternatively, in the present embodiment, signals modulated by the modulation unit 252 of the transmitter 200 and signals received by the reception unit 351 are signals of frames each including a frame number for identification in a header. The modulation unit 252 switches from the first spreading code to the second spreading code at the beginning of a certain frame. The first signal including information for the receiver 300 to identify the second spreading code further includes information indicating the frame number corresponding to the time at which the modulation unit 252 switches from the first spreading code to the second spreading code. Each time a signal is received by the reception unit 351, the demodulation unit 352 of the receiver 300 compares the frame number included in the header of a frame obtained from the received signal with the frame number indicated by the information obtained from the first signal. The demodulation unit 352 switches from the first spreading code to the second spreading code when the frame numbers match with each other. In the example described above, the modulation unit 252 switches from the first spreading code to the second spreading code at the timing of the beginning of the j-th frame. Thus, the demodulation unit 352 detects that the time at which the transmitter 200 has switched from the short-period spreading code to the long-period spreading code is the time corresponding to the j-th frame.

Fourth Embodiment

The description of the present embodiment will focus on differences from the first embodiment.

A configuration of a receiver 300 of a radio communication system 100 according to the present embodiment will be described with reference to FIG. 8.

While a "direct sequence spread method" of multiplying transmission data with a spreading code is applied as the spread spectrum method in the first embodiment, another method, which is a "frequency hopping method", is applied as the spread spectrum method in the present embodiment.

In the present embodiment, the pattern of each spreading code in the first embodiment may be replaced with a frequency hopping pattern. Specifically, direct spreading with the short-period spreading code may be replaced with frequency switching with a short-period frequency hopping pattern, and direct spreading with the long-period spreading code may be replaced with frequency switching with a long-period frequency hopping pattern.

Figure 8:
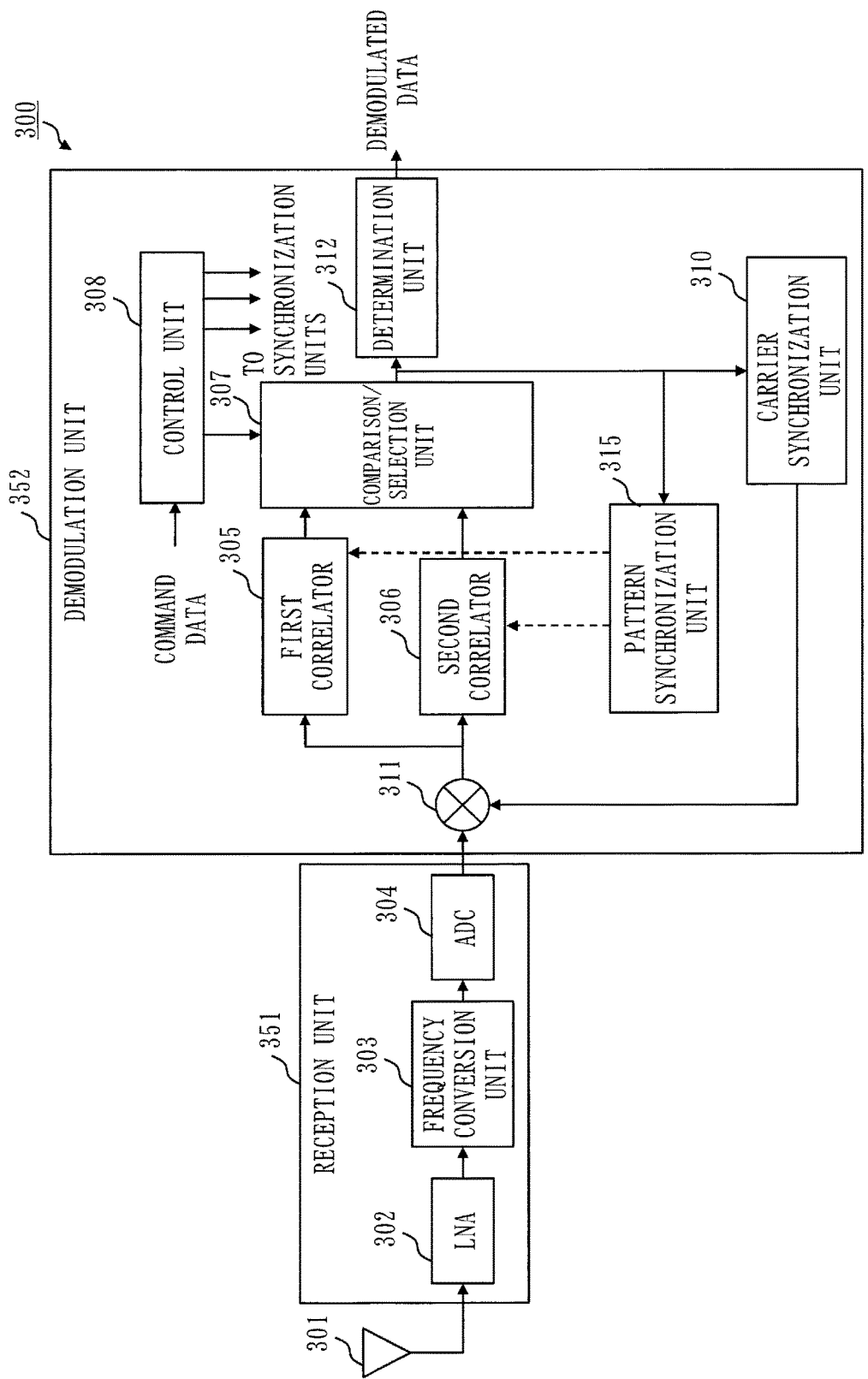
FIG. 8 is a block diagram illustrating a configuration of a receiver of a radio communication system according to a fourth embodiment.

As illustrated in FIG. 8, a demodulation unit 352 of the receiver 300 in the present embodiment may have a configuration that is basically the same as that illustrated in FIG. 3 except that the demodulation unit 352 includes a pattern synchronization unit 315 instead of the code synchronization unit 309 illustrated in FIG. 3. With this configuration, the analog to digital converter 304 performs fast sampling of a wideband frequency-hopped signal to convert the signal into a digital signal. The first correlator 305 obtains correlation between the received signal converted into digital data and a local signal with frequency varying according to the short-period frequency hopping pattern output from the pattern synchronization unit 315, and the second correlator 306 obtains correlation between the received signal converted into digital data and a local signal with frequency varying according to the long-period frequency hopping pattern output from the pattern synchronization unit 315.

As a result of such replacement, the receiver 300 of the present embodiment achieves effects similar to those in the first embodiment, such as retention of synchronization even after the frequency hopping pattern is switched from the short-period to the long-period.

If a high-intensity, narrowband interference wave that saturates the analog to digital converter 304 can be present within the signal band of frequency hopping, a correlation process using an analog circuit is preferable instead of the correlation process using a digital circuit as described above. In this case, processes of converting each local signal generated by the pattern synchronization unit 315 from digital to analog, multiplying the local signal by a received frequency-hopped signal, and extracting a desired primary modulated signal band by a narrowband analog filter allow the correlation processes to be achieved similarly to the digital processing described above. In addition, since a high-intensity, narrowband interference wave as mentioned above can be mostly removed by a narrowband analog filter, which significantly reduces the influence on the demodulation process and the synchronization process, it is also effective to use analog circuits for the correlators of the receiver 300 of the present embodiment in a case where a high-intensity, narrowband interference wave can be present within the signal band of frequency hopping, although the circuit size and the complexity of the analog circuits will increase.

Although not illustrated, the configuration of the transmitter 200 only needs to be changed similarly to the receiver 300.

As described above, in the present embodiment, the modulation unit 252 of the transmitter 200 performs frequency switching using a first frequency hopping pattern instead of performing the spread spectrum using the first spreading code. The modulation unit 252 includes information for the receiver 300 to identify a second frequency hopping pattern into the first signal instead of the information for the receiver 300 to identify the second spreading code. The modulation unit 252 performs frequency switching using the second frequency hopping pattern instead of performing the spread spectrum using the second spreading code. The demodulation unit 352 of the receiver 300 performs frequency switching using the first frequency hopping pattern instead of performing despreading using the first spreading code. The demodulation unit 352 identifies the second frequency hopping pattern on the basis of the information for identifying the second frequency hopping pattern instead of the information for identifying the second spreading code. The demodulation unit 352 performs frequency switching using the second frequency hopping pattern instead of performing despreading using the second spreading code. The first frequency hopping pattern is, specifically, a short-period frequency hopping pattern. The second frequency hopping pattern is a frequency hopping pattern with a longer pattern period than the first frequency hopping pattern, and is, specifically, a long-period frequency hopping pattern. The pattern period of the frequency hopping pattern is preferably about 40 years.

Fifth Embodiment

The description of the present embodiment will focus on differences from the first embodiment.

While the long-period spreading code is a long-period spreading code according to the AES technique in the first to third embodiments, a long-period spreading code is generated by randomly selecting one from N kinds of short-period spreading codes "code#1", "code#2", "code#N", putting the codes together, and giving long periodicity of about 40 years to the random selection, that is, the pattern of codes in the present embodiment.

Three differences from the first embodiment are as follows.

(1) A spreading code pattern is not generated from an AES key, but long periodicity based on an AES key is used for means for randomly selecting one from a plurality of short-period spreading codes.

(2) The spreading code replica "Li-code" (i=1, 2, 3, . . . ) output from the code synchronization unit 309 illustrated in FIG. 3 is changed to any one of short-period spreading codes "code#i" (i≤N).

(3) A function of identifying and avoiding a short-period spreading code number used in a jamming or interference source is additionally provided.

As described in (2) above, since the code synchronization unit 309 in the present embodiment may generate a short-period spreading code by switching the pattern, the circuit can be made smaller and simpler than that in the case of generating a long-period spreading code.

Next, (3) described above will be explained.

Since the receiver 300 of the present embodiment generates a long-period spreading code by the method as described above, the satellite station 102 can detect which code number is used in jamming or interference if a third party has transmitted a jamming wave or if an interference wave has been transmitted with any of N kinds of short-period spreading codes. Furthermore, jamming or interference can be avoided by not using the code number used in jamming or by generating and switching to a new long-period spreading code in the ground station 101 on the basis of the detected code number.

Figure 9:
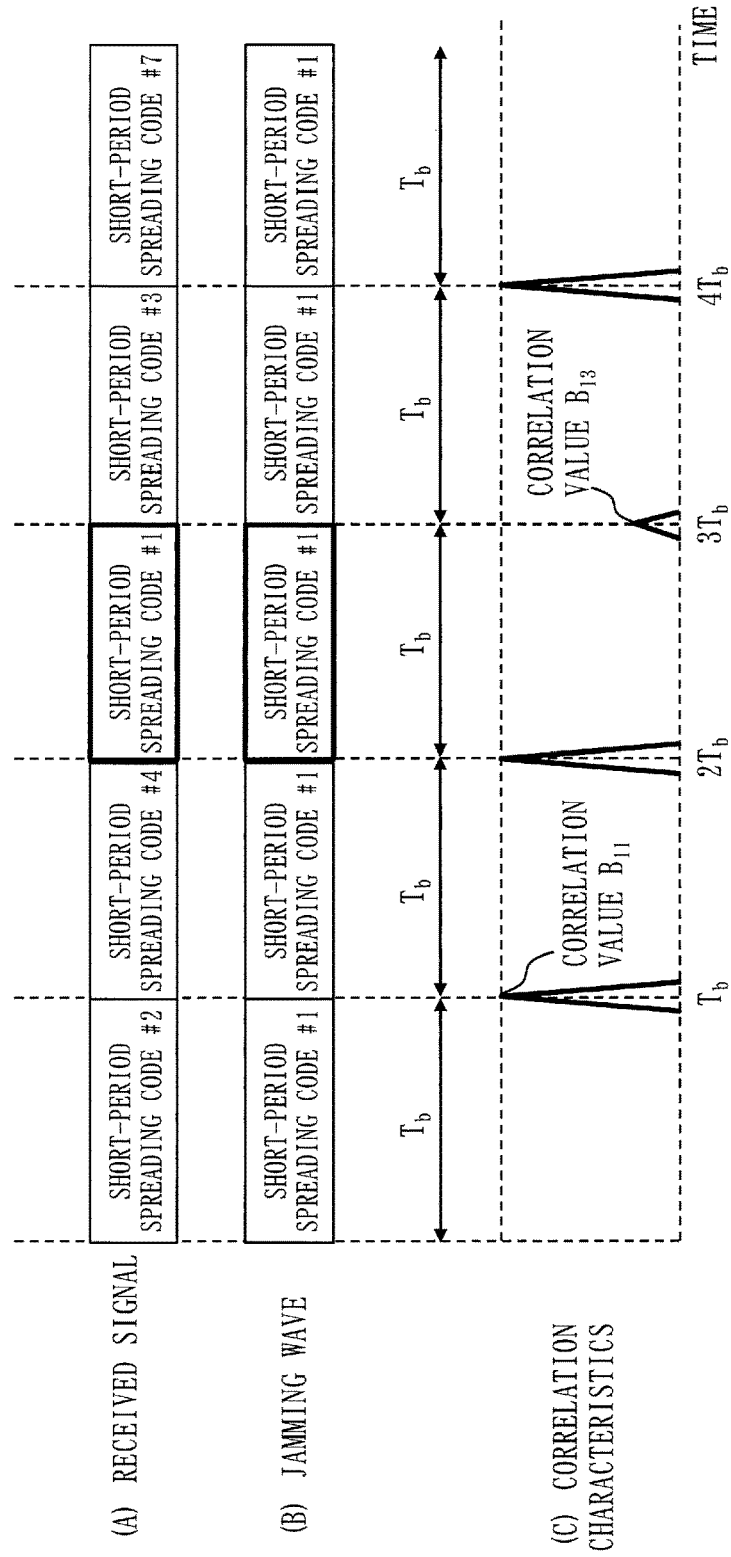
FIG. 9 is a diagram illustrating an example of outputs of correlation values in a receiver of a radio communication system according to a comparative example of a fifth embodiment.

(A) of FIG. 9 illustrates a received signal in the present embodiment already subjected to spread spectrum with a long-period spreading code generated by putting a plurality of short-period spreading codes together. In (A) of FIG. 9, the numbers of the short-period spreading codes used for spread spectrum randomly change in the order of "code#2", "code#4", "code#1", "code#3", and "code#7". The period of the randomness is set to a long period of about 40 years, for example.

In the meantime, (B) of FIG. 9 illustrates a jamming wave in the present embodiment, where the number of the short-period spreading codes used for spread spectrum is "code#1". In this case, the received signal is correlated only in sections spread with "code#1" with the jamming wave spread with the same pattern, and thus the correlation characteristics of the received signal lower only at the corresponding time and are affected by bit errors or the like as illustrated as a correlation value $B_{13}$ in (C) of FIG. 9. In the other sections, however, different code numbers are used, and thus the received signal is not correlated with the signal of the jamming wave, and high correlation characteristics are maintained as illustrated as a correlation value $B_{11}$, etc. in (C) of FIG. 9.

Thus, the satellite station 102 in the present embodiment monitors the correlation values illustrated in (C) of FIG. 9, and when a phenomenon that only the correlation value with a certain spreading code number is lower than the correlation values with the other code numbers is recognized, the satellite station 102 determines that the received signal is subjected to jamming with the spreading code number, that is, "code#1" in the example of FIG. 9. The satellite station 102 further informs the ground station 101 of this status. Alternatively, the ground station 101 monitors over telemetry lines.

The ground station 101 generates a new long-period spreading code without "code#1" used in jamming by randomly selecting codes from (N−1) kinds of short-period spreading codes "code#2", "code#N" excluding "code#1" and putting the selected codes together on the basis of the jamming reception information. In this case as well, long periodicity based on an AES key may be used for the random selection of codes.

Figure 10:
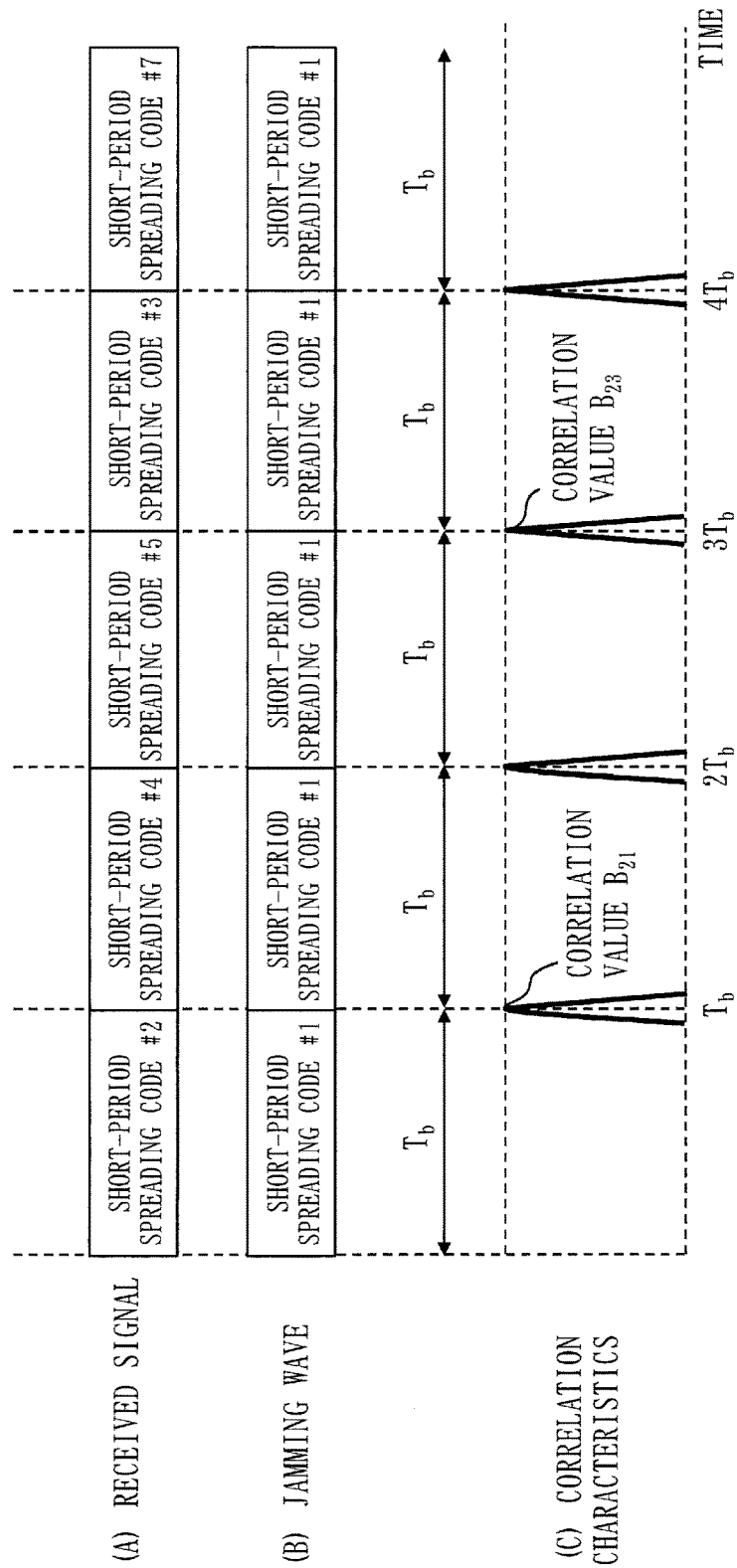
FIG. 10 is a diagram illustrating an example of outputs of correlation values in a receiver of a radio communication system according to the fifth embodiment.

In this case, the pattern of the newly generated long-period spreading code can be updated by the procedures similar to those in steps S11' to S13' in the first embodiment. FIG. 10 illustrates a state in a correlation process after the long-period spreading code is updated in this manner. In (A) of FIG. 10, the numbers of the short-period spreading codes used for spread spectrum randomly change in the order of "code#2", "code#4", "code#5", "code#3", and "code#7", and there is no section in which the short-period spread code numbers match with the number "code#1" of the short-period spreading code used for spread spectrum of the jamming wave illustrated in (B) of FIG. 10. Thus, high correlation values are always obtained as illustrated as a correlation value $B_{21}$ and a correlation value $B_{23}$ in (C) of FIG. 10. As a result of this update, adverse effects such as bit errors caused by the jamming wave before the update can also be avoided.

Note that, during transmission of command signals using short-period spreading codes performed at the initial stage of step S11 described above as well, spread spectrum may be performed by switching between N' kinds of short-period spreading codes given a randomness of relatively short periods without repeating only one kind of short-period spreading code. For example, N'=4, and four kinds of codes given a randomness of eight periods such as "code#2", "code#4", "code#1", "code#4", "code#3", "code#2", "code#3", and "code#1" are used. In addition, the pattern of eight periods is also given as known information to the satellite station 102, which allows synchronization with a signal resulting from spread spectrum by switching between N' kinds of short-period spreading codes to be achieved and command lines to be established in the initial stage.

With such creativity, resistance to jamming is also improved N' times that of a case in which only one kind of short-period spreading code is repeated in the initial stage of step S11 described above. This technique may similarly be applied to the initial stage of step S11 of the first to fourth embodiments in addition to the present embodiment.

Furthermore, in order to correctly know the behavior of the jamming wave and detect the presence or absence of the jamming wave, the receiver 300 of the satellite station 102 may additionally include another correlator for correctly monitoring the jamming wave. Alternatively, since the first correlator 305 provided for synchronization with the short-period spreading code stops operating during synchronization with the long-period spreading code, the first correlator 305 may be used to monitor the jamming wave.

In this case, the receiver 300 uses the additionally provided correlator or the first correlator 305 being stopped during synchronization with the long-period spreading code to perform a despreading process on a received signal by switching between N kinds of short-period spreading code replicas with a certain period such as one second. If high correlation on average is obtained when a certain number "code#Y" is selected from the N code replica numbers although the code number "code#Y" is not used for the received signal, this means that a jamming wave using the code replica number is received. Such a search process of switching between the short-period spreading codes allows determination of the presence of a plurality of jamming waves. Furthermore, continuous observation of the behavior of a certain jamming wave is also possible by stopping the operation of switching between the spreading code replicas "code#1", "code#2", "code#N" and fixing the spreading code replica to the code replica number of the detected jamming wave.

Note that such a function of observing the jamming wave may also be applied to the initial stage of step S11 of the first to fourth embodiments in addition to the present embodiment.

In the description above, "jamming" can be replaced with "interference".

According to the present embodiment, a short-period spreading code used for a jamming wave or an interference wave can be identified.

As described above, in the present embodiment, the second spreading code is not data encrypted by using a common encryption key held by the receiver 300 and the transmitter 200 as in the first embodiment, but is a spreading code obtained by combining a plurality of kinds of first spreading codes in an order identified by data encrypted by using the encryption key. When performing despreading using a first spreading code included in the second spreading code, as despreading using the second spreading code, the demodulation unit 352 of the receiver 300 monitors the presence or absence of a jamming wave or an interference wave by performing despreading using another kind of first spreading code in parallel.

Sixth Embodiment

The description of the present embodiment will focus on differences from the first embodiment.

*Description of Configuration*

Figure 11:
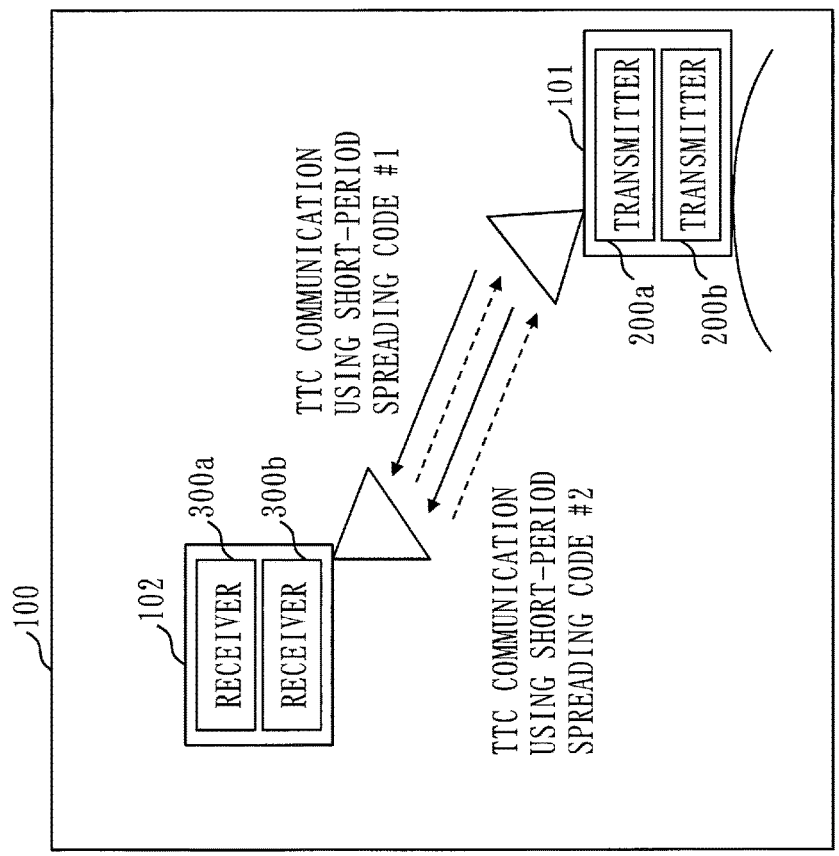
FIG. 11 is a diagram illustrating a configuration of a radio communication system according to a sixth embodiment.

A configuration of a radio communication system 100 according to the present embodiment will be described with reference to FIG. 11.

In the first embodiment the ground station 101 has one transmitter 200. The satellite station 102 has one receiver 300. The ground station 101 transmits a command from one transmitter 200 to one receiver 300 of the satellite station 102. The satellite station 102 transmits telemetry from one receiver 300 to the ground station 101. In the present embodiment, a ground station 101 has two transmitters 200*a* and 200*b*. A satellite station 102 has two receivers 300*a* and 300*b*. The ground station 101 performs TTC communication with each of the two receivers 300*a* and 300*b*. Specifically, the ground station 101 transmits a command from the transmitter 200*a* to the receiver 300*a* of the satellite station 102. The ground station 101 transmits a command from the transmitter 200*b* to the receiver 300*b* of the satellite station 102. The satellite station 102 transmits telemetry from the receiver 300*a* to the transmitter 200*a* of the ground station 101. The satellite station 102 transmits telemetry from the receiver 300*b* to the transmitter 200*b* of the ground station 101.

The two transmitters 200*a* and 200*b* have almost the same configuration as that of the transmitter 200 illustrated in FIG. 2. The two receivers 300*a* and 300*b* have almost the same configuration as that of the receiver 300 illustrated in FIG. 3.

The differences from the first embodiment are as follows, which produce an effect of increased strength to jamming and interference as compared to the first embodiment.

(1) Two kinds of short-period spreading codes can be used as the first spreading code. The receiver 300*a* outputs a correlation value Aa with one of the two kinds of short-period spreading codes. The receiver 300*b* outputs a correlation value Ab with the other of the two kinds of short-period spreading codes.

(2) A function of avoiding a jamming or interference source when either one of two kinds of short-period spreading code numbers that can be used as the first spreading code is equal to the short-period spreading code used for the jamming or interference source is additionally provided.

(3) The configuration of the two receivers 300*a* and 300*b* is different from the configuration of the receiver 300 illustrated in FIG. 3 only in the internal configuration of the code synchronization unit 309 that outputs a short-period spreading code replica.

(1) described above will be explained.

In the present embodiment, the receivers 300*a* and 300*b* perform demodulation in parallel on predetermined respective ones of the two kinds of short-period spreading codes. For example, the receiver 300*a* performs demodulation of the short-period spreading code "code#1" to output the correlation value Aa. The receiver 300*b* performs demodulation of the short-period spreading code "code#2" to output the correlation value Ab. Note that the circuits of the code synchronization units 309 of the receivers 300*a* and 300*b* can be changed so that the short-period spreading codes to be modulated and the correlation values to be output are reversed. Specifically, the receiver 300*a* may perform demodulation of the short-period spreading code "code#2" to output the correlation value Ab. The receiver 300*b* may perform demodulation of the short-period spreading code "code#1" to output the correlation value Aa.

Next, (2) described above will be explained.

In the present embodiment, as described in (1) above, the correlation value Aa is output from the receiver 300*a* and the correlation value Ab is output from the receiver 300*b*. The satellite station 102 informs the ground station 101 of the correlation value Aa and the correlation value Ab by using telemetry. Even if a third party transmits a jamming wave by using either one of the two kinds of short-period spreading code numbers that can be used for the first spreading code, the ground station 101 can detect which number is used for the jamming wave by using the correlation value information {Aa, Ab} transmitted by the telemetry. The ground station 101 can avoid jamming and interference by selecting which of the receivers 300*a* and 300*b* to inform of the AES key to be used for the second spreading code on the basis of the detected code number.

As described in (3) above, the two receivers 300*a* and 300*b* in the present embodiment have the same hardware configuration except the circuit configurations of the code synchronization units 309. The satellite station 102 in the present embodiment can be achieved only by including two receivers 300, each corresponding to the receiver 300 illustrated in FIG. 3, as a redundant configuration and changing the circuit configuration of the code synchronization unit 309 of one of the two receivers 300.

*Description of Operation*

Operation of the radio communication system 100 according to the present embodiment will be described with reference to FIGS. 11 and 12. The operation of the radio communication system 100 corresponds to a radio communication method according to the present embodiment.

Figure 12:
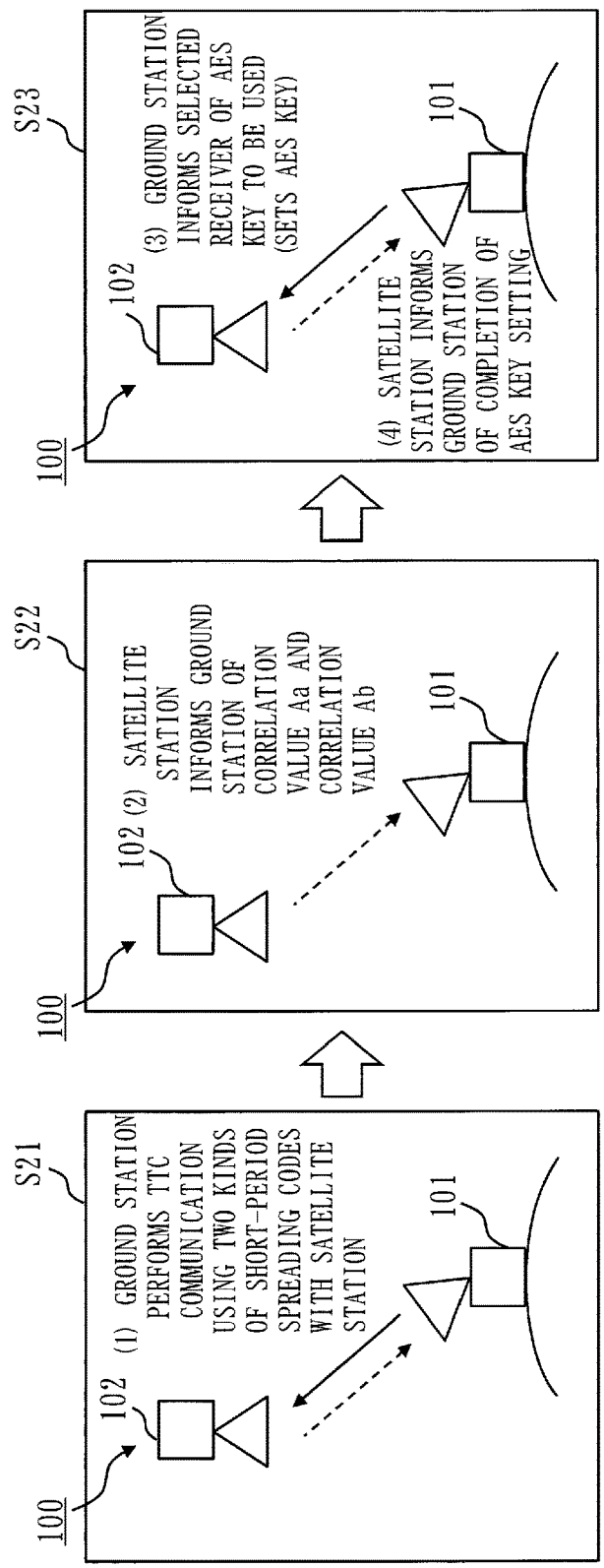
FIG. 12 is a diagram illustrating a key setting flow of the radio communication system according to the sixth embodiment.

FIG. 12 illustrates a flow from a state in which TTC communication using short-period spreading codes is first performed until an AES key is set.

Step S21 represents procedures of performing TTC communication using the short-period spreading codes. The receivers 300*a* and 300*b* of the satellite station 102 set in advance short-period spreading code replicas different from each other. The transmitters 200*a* and 200*b* of the ground station 101 perform TTC communication with the satellite station 102 by using the two short-period spreading codes set in advance.

Step S22 represents procedures of selecting a receiver to inform of an AES key from the receivers 300*a* and 300*b*. The satellite station 102 informs the ground station 101 of the correlation value Aa and the correlation value Ab output from the first correlators 305 of the receivers 300*a* and 300*b*, respectively. The ground station 101 compares the correlation value Aa from the receiver 300*a* with the correlation value Ab from the receiver 300*b*. If correlation value Aa>correlation value Ab, the ground station 101 selects the receiver 300*a*. The ground station 101 also selects the transmitter 200*a* at the same time. If correlation value Aa≤correlation value Ab, the ground station 101 selects the receiver 300*b*. The ground station 101 also selects the transmitter 200*b* at the same time.

Step S23 represents procedures in setting an AES key. The ground station 101 informs the receiver selected in step S22 of one of a plurality of AES keys that are provided in advance. After receiving a corresponding new AES key code, the satellite station 102 sends telemetry informing of completion of AES key setting and of the received AES key code to the ground station 101.

After step S23, the operations in steps S12 and S13 illustrated in FIG. 1 are performed by the combination of the receiver and the transmitter selected in step S22.

*Description of Effects of Embodiment*

In the first embodiment, synchronization with the first spreading code may be difficult in a case where a third party has transmitted a jamming wave by using a short-period spreading code number used for the first spreading code. In the present embodiment, however, since the satellite station 102 has two receivers 300*a* and 300*b* as described above, two kinds of short-period spreading codes can be set as candidates for the first spreading code. Even if a third part has transmitted a jamming wave by using either of the two kinds of short-period spreading code numbers that can be used for the first spreading code, the jamming wave can be avoided.

*Other Configurations*

While the satellite station 102 has two receivers 300*a* and 300*b* in the present embodiment, similar effects are also produced in such a manner that two independent first correlators are provided in one receiver and the first correlators output respective ones of the correlation value Aa and the correlation value Ab. Furthermore, the number of receivers may be increased or the number of first correlators included in one receiver may be increased, so that the number of correlation values is increased. As the number of kinds of short-period spreading codes that can be used as the first spreading code is larger, an effect of further increased strength to jamming and interference is produced. Specifically, when the kinds of short-period spreading codes that can be used as the first spreading code are increased, an effect that a plurality of jamming waves or a plurality of interference sources using N kinds of short-period spreading codes "code#1", "code#2", "code#N" can be avoided in a case where such jamming waves or interference sources are present.

As described above, in the present embodiment, a receiver to be used in the flow of FIG. 1 is selected from a plurality of receivers performing correlation processes on signals using different kinds of first spreading codes, the correlation processes each using a corresponding one of spreading code replicas, depending on the correlation values obtained by the correlation processes. Specifically, a receiver to be used in the flow of FIG. 1 is selected from the receiver 300a that performs a correlation process on a received signal using the short-period spreading code "code#1" and the receiver 300b that performs a correlation process on a received signal using the short-period spreading code "code#2". When the correlation value Aa obtained by the correlation process of the receiver 300a is larger than the correlation value Ab obtained by the correlation process of the receiver 300b, the receiver 300a is selected. When the correlation value Aa obtained by the correlation process of the receiver 300a is smaller than the correlation value Ab obtained by the correlation process of the receiver 300b, the receiver 300b is selected.

Seventh Embodiment

The description of the present embodiment will focus on differences from the first embodiment.

*Description of Configuration*

A configuration of a radio communication system 100 according to the present embodiment will be described with reference to FIG. 13.

Figure 13:
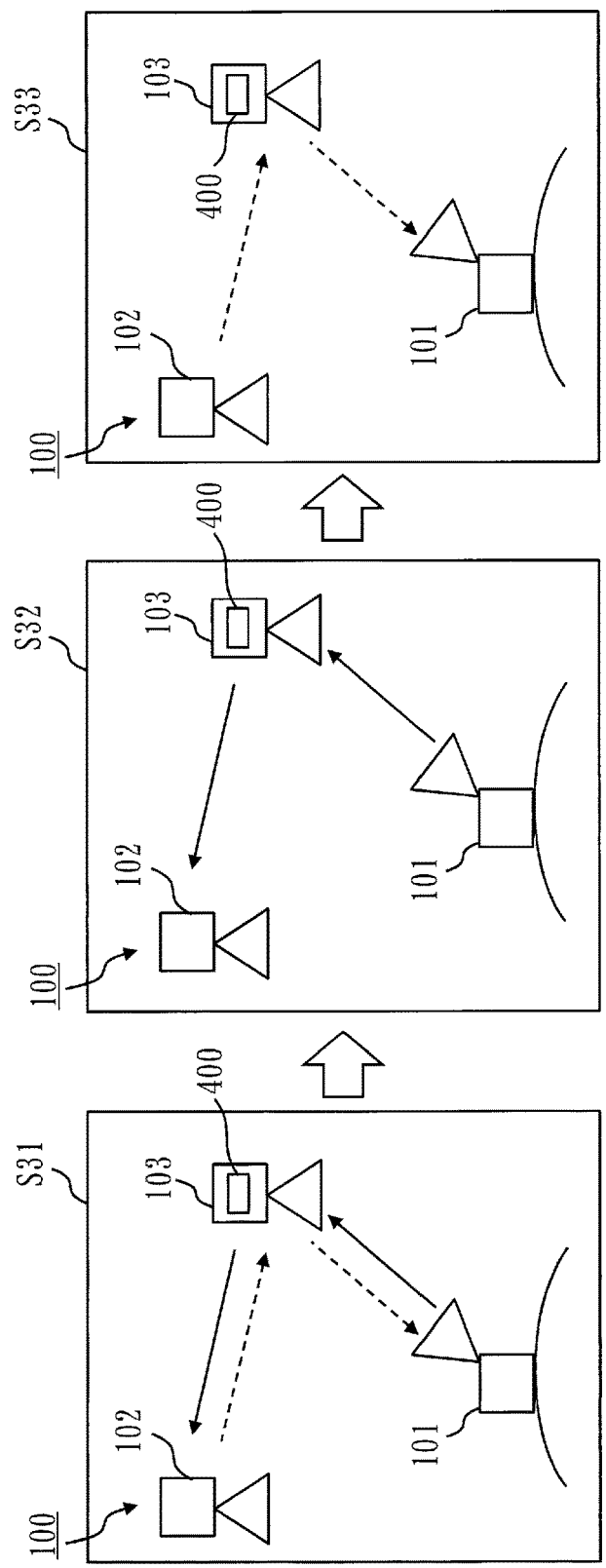
FIG. 13 is a diagram illustrating a long-period spreading code synchronization flow of a radio communication system according to a seventh embodiment.

As illustrated in FIG. 13, the radio communication system 100 includes a relay satellite station 103 in addition to a ground station 101, and a satellite station 102. In the present embodiment, TTC communication is performed via the relay satellite station 103.

The relay satellite station 103 includes a repeater 400.

The repeater 400 relays communication between the transmitter 200 and the receiver 300. Specifically, the repeater 400 sequentially receives signals modulated by the transmitter 200 from the transmitter 200 and performs frequency conversion and amplification on the received signals. The receiver 300 sequentially receives signals returned by the repeater 400 from the repeater 400, demodulate the first signal by performing despreading using the first spreading code, identifies the second spreading code on the basis of information obtained from the first signal, and demodulates the second signal by performing despreading using the second spreading code.

The differences from the first embodiment are as follows.

(1) TTC communication using a short-period spreading code and a long-period spreading code between the ground station 101 and the satellite station 102 is performed via the relay satellite station 103.

(2) A command in setting an AES key is sent from the ground station 101 to the satellite station 102 via the relay satellite station 103. After receiving an AES key code, the satellite station 102 transmits telemetry informing of completion of AES key setting and of the received AES key code to the ground station 101 via the relay satellite station 103.

(3) Switching to a long-period spreading code is performed via the relay satellite station 103 similarly to (1) above.

(4) Secure communication is also achieved for communication between the ground station 101 and the satellite station 102 via the relay satellite station 103.

As described in (1), in the present embodiment, since TTC communication is performed via the relay satellite station 103, TTC communication is also possible in an invisible area between the ground station 101 and the satellite station 102. Thus, an orbiting satellite that orbit the earth can be applied as the satellite station 102.

As described in (1) to (3) above, while communication between the ground station 101 and the satellite station 102 is performed via the relay satellite station 103 in the present embodiment, the configuration of the ground station 101 and the configuration of the satellite station 102 may be the same as those in the first embodiment. Thus, the transmitter 200 and the receiver 300 in the present embodiment may be the same as those in the first embodiment.

In the present embodiment, TTC communication between the ground station 101 and the satellite station 102 is performed via the relay satellite station 103. Thus, jamming or interference toward a forward link and jamming or interference toward a return link from another ground station or anther satellite station are conceivable. Thus, not only the satellite station 102 includes a receiver 300 but also the ground station 101 includes a receiver similar to the receiver 300 of the satellite station 102. Not only the ground station 101 includes a transmitter 200 but also the satellite station 102 includes a transmitter similar to the transmitter 200 of the ground station 101. Note that the forward link refers to a communication path or a communication channel of commands transmitted from the ground station 101 to the satellite station 102 via the relay satellite station 103. The return link refers to a communication path or a communication channel of telemetry transmitted from the satellite station 102 to the ground station 101 via the relay satellite station 103.

*Description of Operation*

Operation of the radio communication system 100 according to the present embodiment will be described with reference to FIG. 13. The operation of the radio communication system 100 corresponds to a radio communication method according to the present embodiment.

FIG. 13 illustrates a flow from a state in which TTC communication using a short-period spreading code is first performed until the state is switched to a state in which TTC communication using a long-period spreading code.

Step S31 represents procedures in setting an AES key. During command communication using a short-period spreading code, the ground station 101 informs the satellite station 102 of one of a plurality of AES keys that are provided in advance via the relay satellite station 103. After receiving the corresponding AES key code, the satellite station 102 transmits telemetry informing of completion of AES key setting and of the received AES key code to the ground station 101 via the relay satellite station 103.

Step S32 represents procedures of switching to a long-period spreading code. Upon recognizing that the AES key code transmitted via the relay satellite station 103 matches with the AES key code received from the satellite station 102 via the relay satellite station 103 and that the setting of the AES key is thus completed, the ground station 101 switches to transmission using a long-period spreading code based on the AES key during synchronization with the short-period spreading code. The timing of this switching is similar to that in the first embodiment. The transmission using the long-period spreading code is performed via the relay satellite station 103.

Step S33 represents procedures of informing of completion of long-period spreading code synchronization. The satellite station 102 performs synchronization with a signal spread with a long-period spreading code by using a long-period spreading code replica generated with the AES key, and transmits a telemetry signal informing of synchronization with the long-period spreading signal to the ground station 101 via the relay satellite station 103 when the synchronization is completed. This concrete synchronization method is also similar to that in the first embodiment.

Note that a change to a new AES key is also performed similarly to the procedures described above. Specifically, procedures in steps S31' to S33' are performed.

Step S31' represents procedures in setting a new AES key. During command communication using a long-period spreading code using the AES key being currently used, the ground station 101 informs the satellite station 102 of a new key different from the AES key being currently used from the AES keys provided in advance via the relay satellite station 103. After receiving the corresponding new AES key code, the satellite station 102 transmits telemetry informing of completion of AES key setting and of the received AES key code to the ground station 101 via the relay satellite station 103.

Step S32' represents procedures of switching to a new long-period spreading code. Upon recognizing that the AES key code transmitted via the relay satellite station 103 matches with the AES key code received from the satellite station 102 via the relay satellite station 103 and that the setting of the AES key is thus completed, the ground station 101 switches to transmission using a long-period spreading code based on the new AES key during synchronization with the current long-period spreading code. The transmission using the long-period spreading code is performed via the relay satellite station 103.

Step S33' represents procedures of informing completion of new long-period spreading code synchronization. The satellite station 102 performs synchronization with a signal spread with a new long-period spreading code from the ground station 101 by using a long-period spreading code replica generated on the basis of the new AES key, and transmits a telemetry signal informing of synchronization with the new long-period spreading signal to the ground station 101 via the relay satellite station 103 when the synchronization is completed.

*Description of Effects of Embodiment*

According to the series of operations as described above, effects similar to those of the first embodiment are produced for the forward link and the return link in the radio communication system 100 including the relay satellite station 103. Specifically, on each of the links, the possibility of the synchronization process with the long-period spreading code being disturbed by third parties is eliminated, continuous transition from the state in which synchronization with the short-period spreading code is established to synchronization with the long-period spreading code is enabled without requiring time of several seconds for switching to the long-period spreading code and establishment of synchronization. This fast establishment of synchronization is effective in particular in handover when an orbiting satellite switches communication with a ground station present in an area to communication with a ground station present in another area. The time during which communication is disable is shortened, which reduces constraints in operation.

Eighth Embodiment

The description of the present embodiment will focus on differences from the fifth embodiment.

In the present embodiment, the modulation unit 252 of the transmitter 200 includes a function of changing a code output timing.

In the fifth embodiment, in a case where a jamming wave or an interference wave is transmitted to a received signal with a long-period spreading code generated with N kinds of short-period spreading codes, the satellite station 102 detects which code number is used in jamming or interference. The ground station 101 then avoids the jamming or interference by not using the code number used in the jamming or interference or by generating a new long-period spreading code and switching the long-period spreading code on the basis of the code number detected by the satellite station 102.

In the present embodiment, the transmitter 200 of the ground station 101 includes the modulation unit 252 having the function of changing the code output timing. Thus, in a state in which TTC communication using the long-period spreading code is performed, that is, in a state in which synchronization with the long-period spreading code is established, the synchronization timing can be shifted on the time axis. The demodulation unit 352 of the receiver 300, which includes the code synchronization unit 309 to establish code synchronization, is capable of maintaining code synchronization within a range permitted by a synchronization circuit of the code synchronization unit 309 even when the modulation unit 252 has changed the code output timing.

Specifically, the change in the code output timing is performed by intentionally and gradually shifting the phase of a clock to generate a code in the modulation unit 252. Since code synchronization is lost in the demodulation unit 352 when the amount of change in the clock phase is too large, the clock phase needs to be changed within a range permitted by the synchronization circuit of the code synchronization unit 309. The amount of change in the clock phase in the modulation unit 252 can be set in advance in the code synchronization unit 309 of the demodulation unit 352, so that the time required for synchronization after the change in the clock phase is reduced. The ground station 101 preferably transmit information on the timing at which the clock phase is to be changed to the satellite station 102 by a command signal.

Effects produced by shifting the timing of synchronization with the long-period spreading code on the time axis as described above will be explained with reference to FIG. 14.

Figure 14:
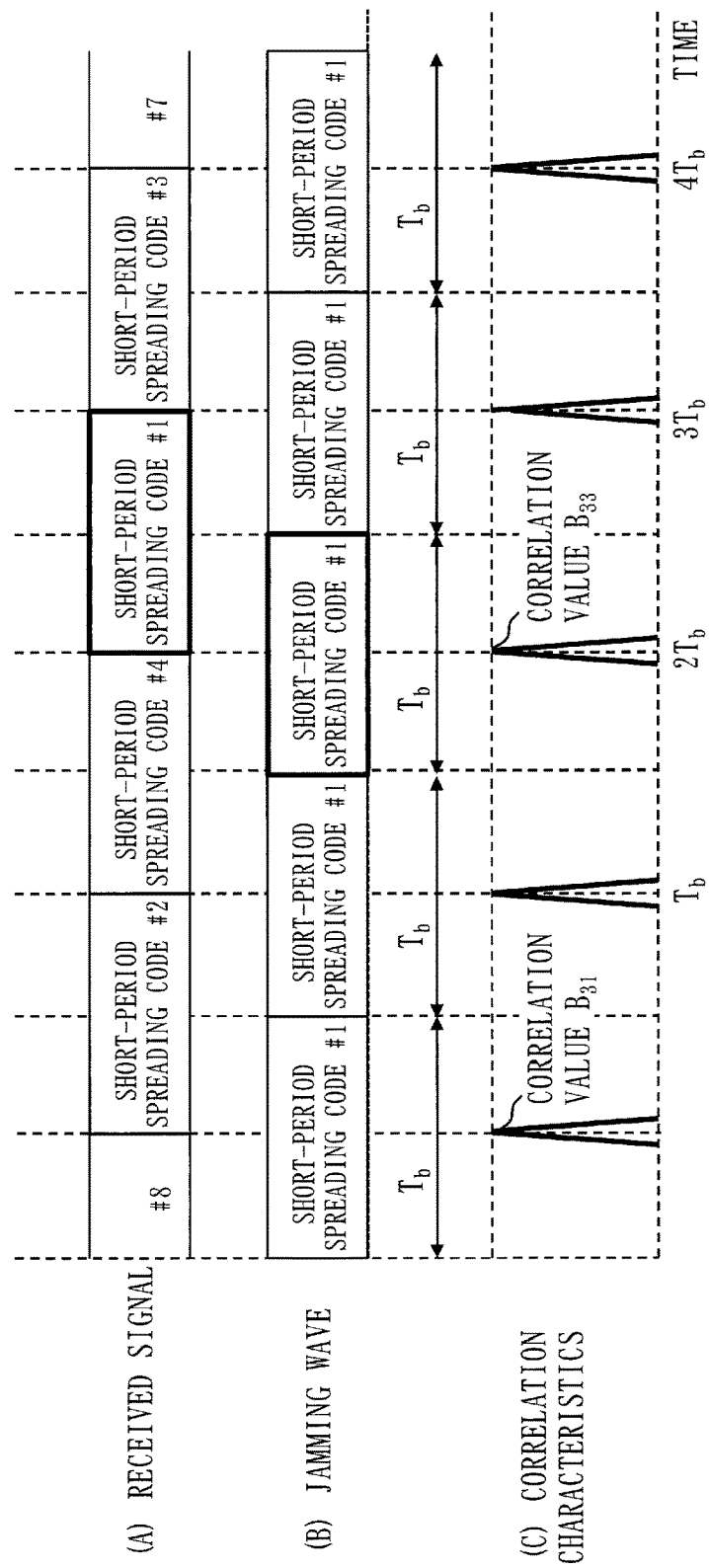
FIG. 14 is a diagram illustrating an example of outputs of correlation values in a receiver of a radio communication system according to an eighth embodiment.

(A) of FIG. 14 illustrates a received signal in the present embodiment, where the numbers of the short-period spreading codes used for spread spectrum randomly change in the order of "code#8", "code#2", "code#4", "code#1", "code#3", and "code#7".

(B) of FIG. 14 illustrates a jamming wave in the present embodiment, where the number of the short-period spreading codes used for spread spectrum is "code#1". In the present embodiment, since the ground station 101 intentionally changes the output timing of code, the probability that the timings of codes of the received signal and the jamming wave match each other significantly reduces as the relation of timings between (A) and (B) in FIG. 14. Note that the timings of codes in (A) and (B) of FIG. 14 are different from each other by one or more chips.

In FIG. 14, no correlation occurs between a section of the received signal spread with "code#1" and the jamming wave spread with the same pattern owing to the difference of one or more chips between the timings. Thus, as illustrated as a correlation value $B_{33}$ in (C) of FIG. 14, the correlation is not lowered in this section, and high correlation characteristics similarly to a correlation value $B_{31}$ are maintained.

As described above, in the present embodiment, the modulation unit 252 changes the output timing of the first spreading code included in the second spreading code. Since the modulation unit 252 has the function of changing the code output timings, the timing of synchronization with the short-period spreading code in the received signal is shifted, which improves the correlation characteristics between a received signal and a jamming wave or an interference wave. This allows jamming and interference to be avoided.

Note that the output timing of the short-period spreading code may also be changed in addition to the output timing of the long-period spreading code as described above. The change in the code output timing can be applied to a state before an AES key is set, that is, a state in which TTC communication using the short-period spreading code is performed, which similarly allows jamming and interference to be avoided.

Ninth Embodiment

The description of the present embodiment will focus on differences from the fifth embodiment.

A configuration of a receiver 300 of a radio communication system 100 according to the present embodiment will be described with reference to FIG. 15.

In the present embodiment, the demodulation unit 352 of the receiver 300 includes an automatic gain control (AGC) 316. The configuration of the receiver 300 other than the above is the same as that illustrated in FIG. 3.

In the fifth embodiment, in a case where a jamming wave or an interference wave is transmitted to a received signal with a long-period spreading code generated with N kinds of short-period spreading codes, the satellite station 102 detects which code number is used in jamming or interference. The ground station 101 then avoids the jamming or interference by not using the code number used in the jamming or interference or by generating a new long-period spreading code and switching the long-period spreading code on the basis of the code number detected by the satellite station 102.

In the present embodiment, in a case where a jamming wave or an interference wave is transmitted to a received signal with the long-period spreading code generated with N kinds of short-period spreading codes, the satellite station 102 avoids the jamming or interference by amplitude adjustment of the signal by the automatic gain control 316.

Specifically, amplitude adjustment of a digital signal resulting from sampling by the analog to digital converter 304 is performed by the automatic gain control 316. The digital signal with an adjusted amplitude output from the automatic gain control 316 is input to the complex multiplier 311. The code synchronization unit 309 outputs information on switching timings of short-period spreading codes to generate a long-period spreading code to the automatic gain control 316. The automatic gain control 316 performs amplitude adjustment of a signal only in a section of a short-period spreading code subjected to the influence of jamming or interference on the basis of the switching timing information, so as to avoid the jamming or interference.

In the fifth embodiment, the ground station 101 performs processes of identifying a code number used for jamming on the basis of jamming reception information informed of by the satellite station 102, selecting short-period spreading codes excluding the identified code number, and generating a long-period spreading code. In the present embodiment, there processes are not necessary.

Figure 15:
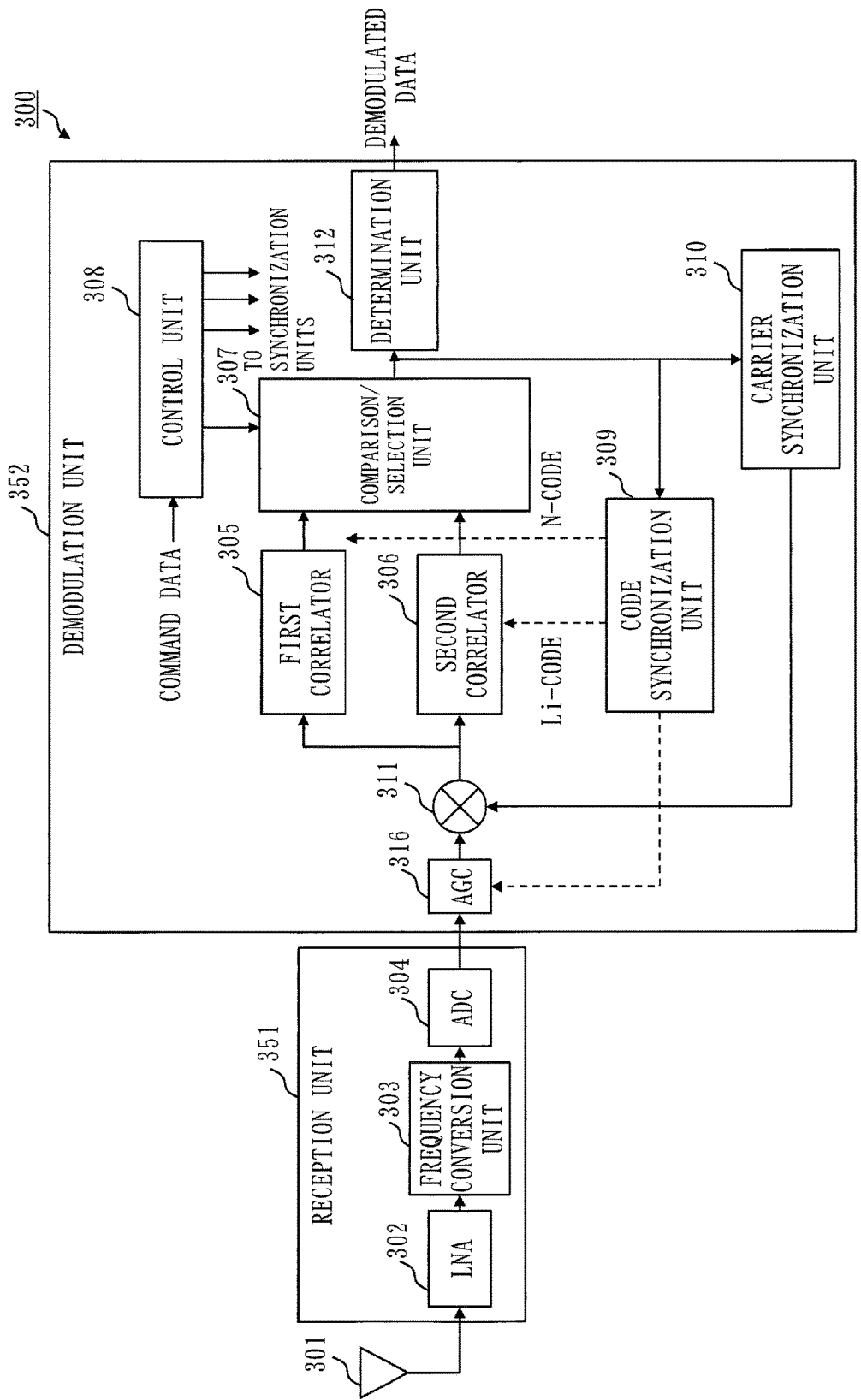
FIG. 15 is a block diagram illustrating a configuration of a receiver of a radio communication system according to a ninth embodiment.

As illustrated in FIG. 15, the demodulation unit 352 of the receiver 300 includes the automatic gain control 316. A change from the receiver 300 of the fifth embodiment to the receiver 300 of the present embodiment is only addition of the automatic gain control 316.

A flow of procedures will be described.

The following two cases are considered as being cases where amplitude adjustment is to be performed by the automatic gain control 316:

(a) a case where the correlation characteristics are slightly lowered by a jamming wave; and (b) a case where the correlation characteristics are significantly lowered by a jamming wave.

The above (a) will be explained with reference to FIGS. 16 and 17.

Figure 16:
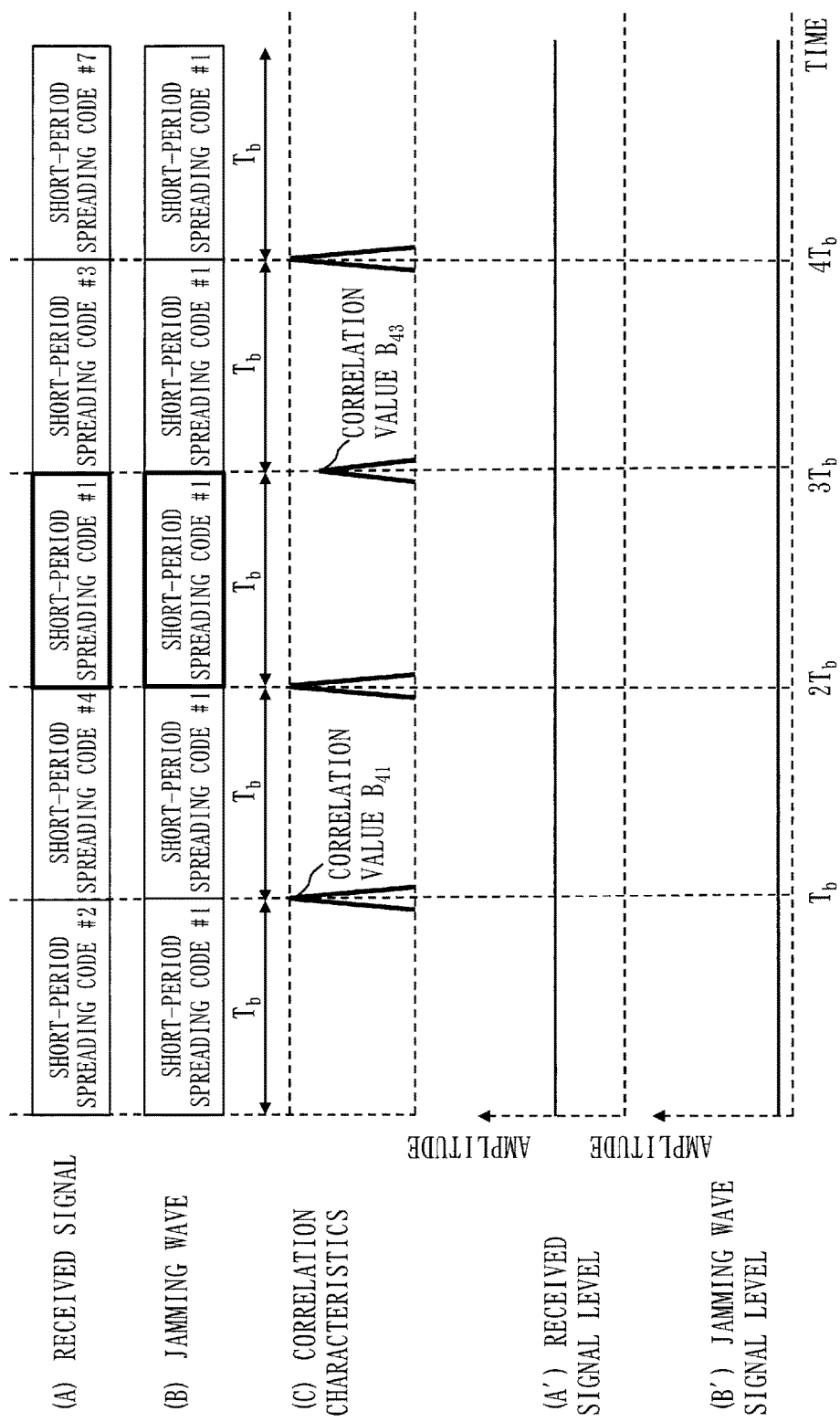
FIG. 16 is a diagram illustrating an example of outputs of correlation values in the receiver of the radio communication system according to the ninth embodiment.
Figure 17:
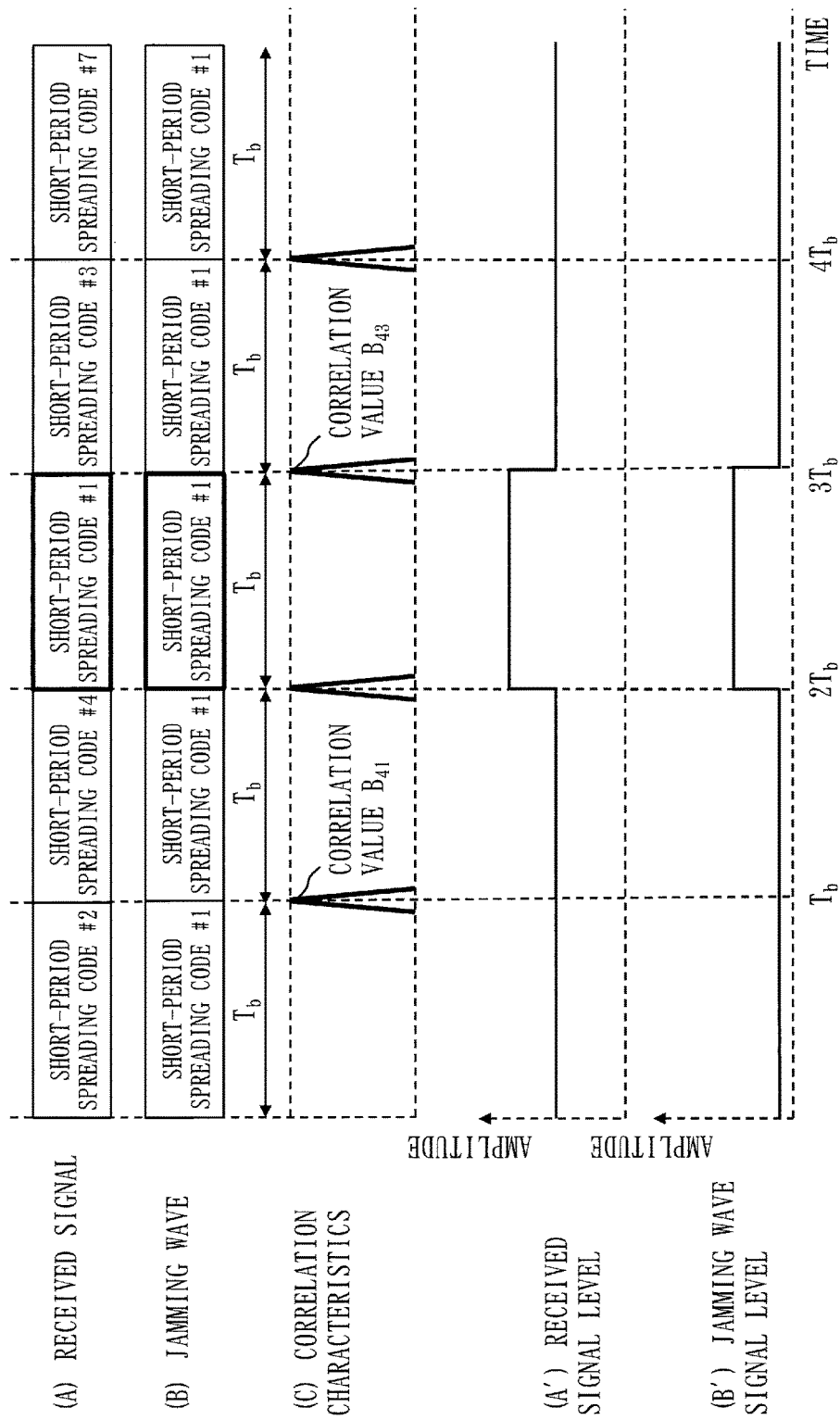
FIG. 17 is a diagram illustrating an example of outputs of correlation values in the receiver of the radio communication system according to the ninth embodiment.

(A) of FIG. 16 illustrates a received signal in the present embodiment. (B) FIG. 16 illustrates a jamming wave in the present embodiment. (C) of FIG. 16 illustrates correlation characteristics in the present embodiment. All of the above are similar to those in the example illustrated in FIG. 9. (A') of FIG. 16 illustrates a received signal level in the present embodiment. (B') of FIG. 16 illustrates a jamming wave signal level in the present embodiment. Since the received signal is correlated only in sections spread with "code#1" with the jamming wave spread with the same pattern, the correlation characteristics of the received signal lower only at the corresponding time as illustrated as the correlation value $B_{43}$ in (C) of FIG. 16. As illustrated in (A') and (B') of FIG. 16, however, if the jamming wave signal level <<the received signal level, the amount by which the correlation characteristics lower is very small as compared to the correlation value $B_{41}$ illustrated in (C) of FIG. 16.

In the present embodiment, the automatic gain control 316 is used to perform amplitude adjustment of the received signal level and the jamming wave signal level only in the sections in which the correlation characteristics lower. FIG. 17 illustrates a state of signal processing after the amplitude adjustment is performed by the automatic gain control 316. As illustrated in (A') of FIG. 17, the amplitude of the received signal level is increased, so that the correlation characteristics are improved. Note that, when the amplitude of the received signal level is increased, the amplitude of the jamming wave signal level also increases as illustrated in (B') of FIG. 17, but the influence of the amplification of the jamming wave can be ignored because the effect of improvement in the correlation characteristics resulting from the increase in the amplitude of the received signal level is significant.

Next, the above (b) will be explained with reference to FIGS. 18 and 19.

Figure 18:
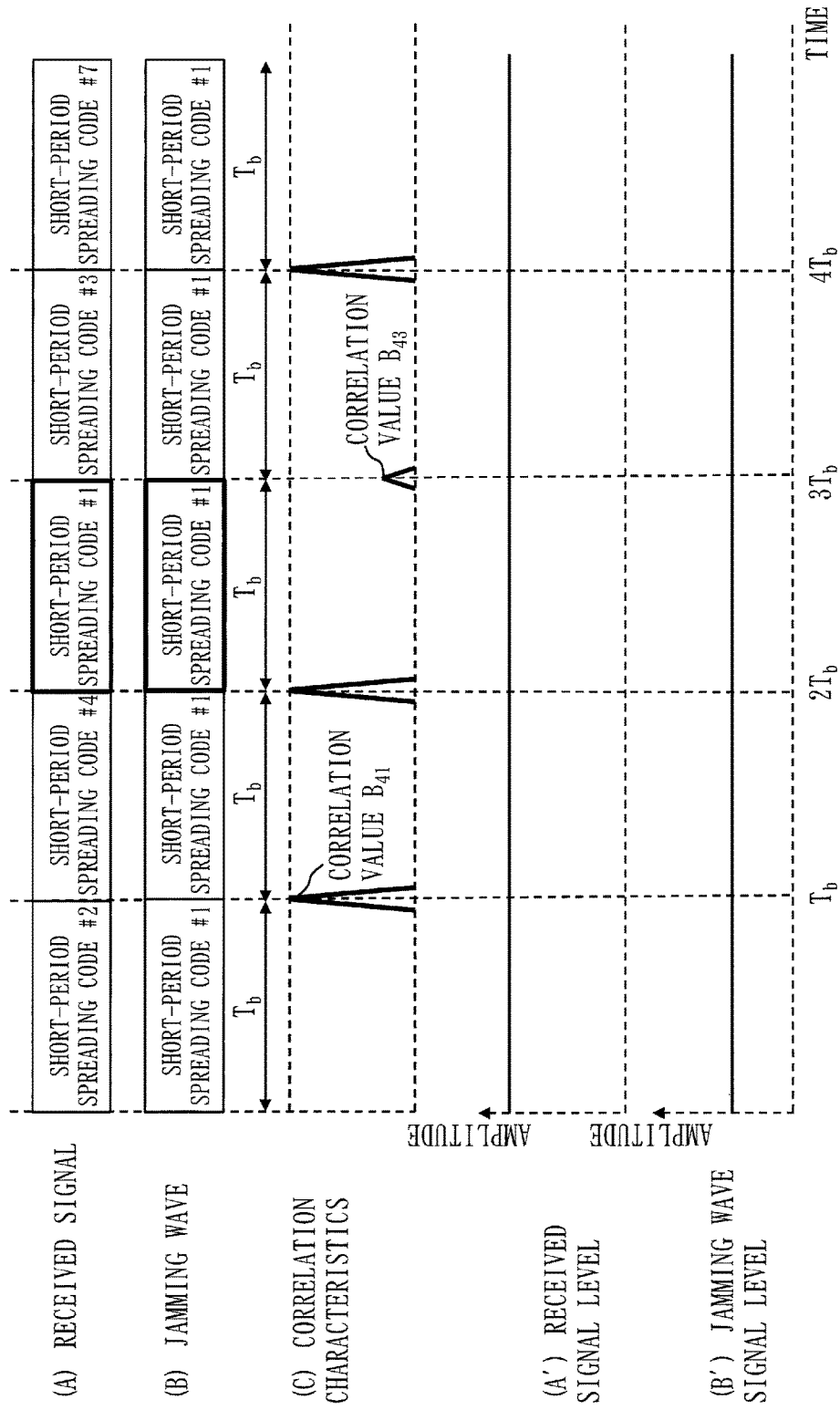
FIG. 18 is a diagram illustrating an example of outputs of correlation values in the receiver of the radio communication system according to the ninth embodiment.
Figure 19:
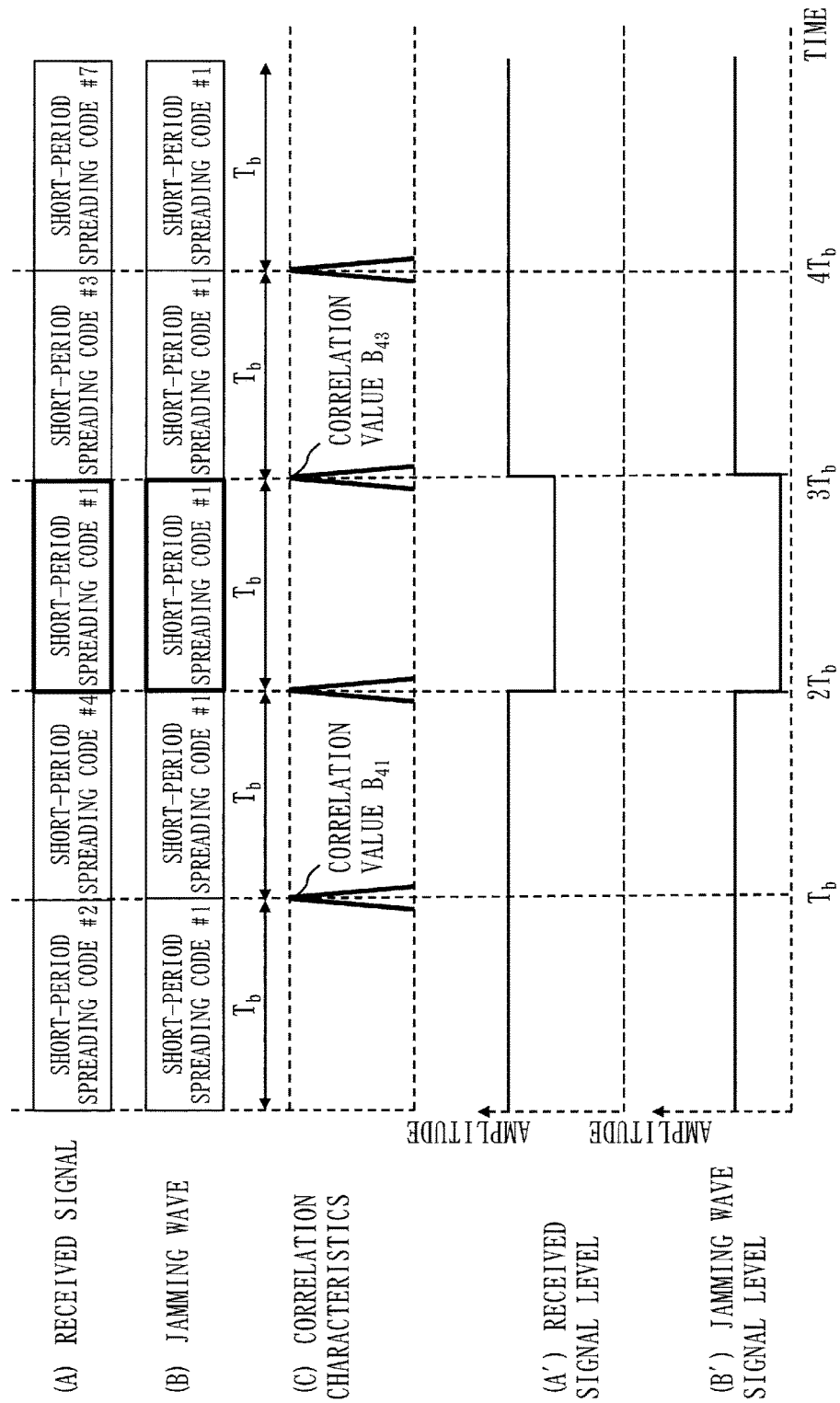
FIG. 19 is a diagram illustrating an example of outputs of correlation values in the receiver of the radio communication system according to the ninth embodiment.

(A) of FIG. 18 illustrates a received signal in the present embodiment. (B) FIG. 18 illustrates a jamming wave in the present embodiment. (C) of FIG. 18 illustrates correlation characteristics in the present embodiment. All of the above are similar to those in the example illustrated in FIG. 9. (A') of FIG. 18 illustrates a received signal level in the present embodiment. (B') of FIG. 18 illustrates a jamming wave signal level in the present embodiment. Since the received signal is correlated only in sections spread with "code#1" with the jamming wave spread with the same pattern, the correlation characteristics of the received signal lower only at the corresponding time as illustrated as the correlation value $B_{43}$ in (C) of FIG. 18. As illustrated in (A') and (B') of FIG. 18, however, if the jamming wave signal level <the received signal level, the amount by which the correlation characteristics lower is large as compared to the correlation value $B_{41}$ illustrated in (C) of FIG. 18.

In the present embodiment, the automatic gain control 316 is used to perform amplitude adjustment of the received signal level and the jamming wave signal level only in the sections in which the correlation characteristics lower. FIG. 19 illustrates a state of signal processing after the amplitude adjustment is performed by the automatic gain control 316. As illustrated in (B') of FIG. 19, the amplitude of the jamming wave signal level is attenuated, so that the correlation characteristics are improved. Note that, when the amplitude of the jamming wave signal level is attenuated, the amplitude of the received signal level is also attenuated as illustrated in (A') of FIG. 19, but the influence of the attenuation of the received signal can be ignored because the effect of improvement in the correlation characteristics resulting from the attenuation in the amplitude of the jamming wave signal level is significant.

The automatic gain control 316 in the present embodiment limits the sections of amplitude adjustment on the basis of the information on switching timings of N short-period spreading codes for generating a long-period spreading code output from the code synchronization unit 309. Specifically, the demodulation unit 352 performs a correlation process using a spreading code replica corresponding to the first spreading code included in the second spreading code before demodulation of the second signal, and adjusts the amplitude of the second signal depending on the correlation value obtained by the correlation process. Specifically, the demodulation unit 352 monitors changes in the correlation values, and when slight lowering of the correlation value corresponding to (a) described above is detected, increases the amplitude of the second signal by the automatic gain control 316. When significant lowering of the correlation value corresponding to (b) described above is detected, the demodulation unit 352 attenuates the amplitude of the second signal by the automatic gain control 316.

In the description of the example above, "jamming" can be replaced with "interference".

In the present embodiment, the automatic gain control 316 is capable of adjusting the amplitudes of a received signal and a jamming wave signal to avoid jamming or interference.

Some embodiments of the present invention have been described above; two or more of the embodiments may be combined. Alternatively, one embodiment or combination of two or more embodiments among the embodiments above may be partially carried out. Note that the present invention is not limited to the embodiments, but various modifications may be made thereto where necessary.

REFERENCE SIGNS LIST

100: radio communication system, 101: ground station, 102: satellite station, 103: relay satellite station, 200: transmitter, 200a: transmitter, 200b: transmitter, 201: transmission antenna, 251: transmission unit, 252: modulation unit, 300: receiver, 300a: receiver, 300b: receiver, 301: reception antenna, 302: low noise amplifier, 303: frequency conversion unit, 304: analog to digital converter, 305: first correlator, 306: second correlator, 307: comparison/selection unit, 308: control unit, 309: code synchronization unit, 310: carrier synchronization unit, 311: complex multiplier, 312: determination unit, 313: correlator, 314: frame synchronization unit, 315: pattern synchronization unit, 316: automatic gain control, 351: reception unit, 352: demodulation unit, 400: repeater

The invention claimed is:

1. A receiver comprising:
a reception unit to sequentially receive modulated signals resulting from a spread spectrum from a transmitter; and
a demodulation unit to demodulate a first signal received by the reception unit by performing despreading using a first spreading code, the first signal including information for identifying a second spreading code with a longer code period than the first spreading code, identify the second spreading code on a basis of information obtained from the first signal, and demodulate a second signal received after the first signal by the reception unit by performing despreading using the second spreading code,
wherein the demodulation unit performs, on a signal received by the reception unit, a first correlation process using a first code replica corresponding to the first spreading code and a second correlation process using a second code replica corresponding to the second spreading code, detects a time when the transmitter has switched from the first spreading code to the second spreading code on a basis of a first correlation value obtained by the first correlation process and a second correlation value obtained by the second correlation process, and switches from the first spreading code to the second spreading code at a time corresponding to the detected time.

2. The receiver according to claim 1, wherein the demodulation unit averages first correlation values and averages second correlation values, and determines whether or not the detected time is correct on a basis of results of averaging.

3. The receiver according to claim 2, wherein when the detected time is determined to be erroneous, the demodulation unit estimates the time when the transmitter has switched from the first spreading code to the second spreading code from a number of samples used for the averaging, and switches from the first spreading code to the second spreading code at a time corresponding to the estimated time.

4. The receiver according to claim 1, wherein
the information included in the first signal is information identifying a common encryption key held by the receiver and the transmitter, and
the second spreading code is data encrypted using the encryption key.

5. A receiver comprising:
a reception unit to sequentially receive modulated signals resulting from a spread spectrum from a transmitter; and
a demodulation unit to demodulate a first signal received by the reception unit by performing despreading using a first spreading code, the first signal including information for identifying a second spreading code with a longer code period than the first spreading code, identify the second spreading code on a basis of information obtained from the first signal, and demodulate a second signal received after the first signal by the reception unit by performing despreading using the second spreading code,
wherein
the signal received by the reception unit is a signal of frames each including a frame number for identification in a header,
the first signal further includes information indicating a frame number corresponding to a time when the transmitter has switched from the first spreading code to the second spreading code, and
each time a signal is received by the reception unit, the demodulation unit compares a frame number included in a header of a frame obtained from the received signal with the frame number indicated by the information obtained from the first signal, and switches from the first spreading code to the second spreading code when the frame numbers match with each other.

6. A receiver comprising:
a reception unit to sequentially receive modulated signals resulting from a spread spectrum from a transmitter; and a demodulation unit to demodulate a first signal received by the reception unit by performing despreading using a first spreading code, the first signal including information for identifying a second spreading code with a longer code period than the first spreading code, identify the second spreading code on a basis of information obtained from the first signal, and demodulate a second signal received after the first signal by the reception unit by performing despreading using the second spreading code, wherein the information included in the first signal is information identifying a common encryption key held by the receiver and the transmitter, and the second spreading code is a spreading code constituted by a combination of a plurality of kinds of first spreading codes in an order identified by data encrypted using the encryption key, wherein the demodulation unit monitors correlations values each obtained by a correlation process, and before demodulating the second signal, the demodulation unit adjusts an amplitude of the second signal depending on detected change in a correlation value.

7. The receiver according to claim 6, wherein the correlation value is obtained by the correlation process using a spreading code replica corresponding to a first spreading code included in the second spreading code.

8. A radio communication system comprising:

a transmitter to modulate a first signal by performing spread spectrum using a first spreading code, the first signal including information for identifying a second spreading code with a code period longer than the first spreading code, modulate a second signal to be transmitted after the first signal by performing spread spectrum using the second spreading code, and sequentially transmit modulated signals; and a receiver comprising a reception unit to sequentially receive modulated signals resulting from a spread spectrum from a transmitter; and a demodulation unit to demodulate a first signal received by the reception unit by performing despreading using a first spreading code, the first signal including information for identifying a second spreading code with a longer code period than the first spreading code, identify the second spreading code on a basis of information obtained from the first signal, and demodulate a second signal received after the first signal by the reception unit by performing despreading using the second spreading code, wherein the demodulation unit performs, on a signal received by the reception unit, a first correlation process using a first code replica corresponding to the first spreading code and a second correlation process using a second code replica corresponding to the second spreading code, detects a time when the transmitter has switched from the first spreading code to the second spreading code on a basis of a first correlation value obtained by the first correlation process and a second correlation value obtained by the second correlation process, and switches from the first spreading code to the second spreading code at a time corresponding to the detected time, the receiver sequentially receiving signals modulated by the transmitter from the transmitter, by the reception unit.

9. The radio communication system according to claim 8, wherein the receiver is selected from a plurality of receivers performing correlation processes on signals using different kinds of first spreading codes, the correlation processes each using a corresponding one of spreading code replicas, the receiver being selected depending on correlation values obtained by the correlation processes.

10. The radio communication system according to claim 8, further comprising a repeater to relay communication between the transmitter and the receiver.

11. A transmitter comprising:

a modulation unit to modulate a first signal by performing spread spectrum using a first spreading code, the first signal including information for a receiver to identify a second spreading code with a longer code period than the first spreading code, and demodulate a second signal to be transmitted after the first signal by performing spread spectrum using the second spreading code; and a transmission unit to sequentially transmit signals modulated by the modulation unit to the receiver, wherein the first signal further includes information indicating a time when the modulation unit switches from the first spreading code to the second spreading code, wherein the modulation unit switches from the first spreading code to the second spreading code at:

(i) a beginning of any one of code periods of the first spreading code, or (ii) a beginning of any of a plurality of bit strings each having a fixed length and which constitute a signal of data modulated by the modulation unit.

12. A radio communication method comprising:

by a transmitter, modulating a first signal by performing spread spectrum using a first spreading code, the first signal including information for identifying a second spreading code with a code period longer than the first spreading code, modulating a second signal to be transmitted after the first signal by performing spread spectrum using the second spreading code, and sequentially transmitting modulated signals; and by a receiver, sequentially receiving signals modulated by the transmitter from the transmitter, demodulating the first signal by performing despreading using the first spreading code, identifying the second spreading code on a basis of information obtained from the first signal, and demodulating the second signal by performing despreading using the second spreading code, wherein the receiver performs, on a signal received, a first correlation process using a first code replica corresponding to the first spreading code and a second correlation process using a second code replica corresponding to the second spreading code, detects a time when the transmitter has switched from the first spreading code to the second spreading code on a basis of a first correlation value obtained by the first correlation process and a second correlation value obtained by the second correlation process, and switches from the first spreading code to the second spreading code at a time corresponding to the detected time.

* * * * *